US012589978B2

(12) United States Patent
    Grothaus et al.

(10) Patent No.: US 12,589,978 B2
(45) Date of Patent: Mar. 31, 2026

(54) TRUCK-TABLET INTERFACE

(71) Applicant: Crown Equipment Corporation, New Bremen, OH (US)

(72) Inventors: Brent Grothaus, Delphos, OH (US); Dean Winner, Celina, OH (US); Anthony Castaneda, Troy, OH (US); Dan Walton, St. Louis, MO (US); Ray Denison, Bradford, OH (US); Allen Wagner, Troy, OH (US); Jamison Frady, Sidney, OH (US)

(73) Assignee: Crown Equipment Corporation, New Bremen, OH (US)

( * ) Notice: Subject to any disclaimer, the term of this patent is extended or adjusted under 35 U.S.C. 154(b) by 498 days.

(21) Appl. No.: 17/664,256

(22) Filed: May 20, 2022

(65) Prior Publication Data
    US 2022/0371867 A1     Nov. 24, 2022

Related U.S. Application Data

(60) Provisional application No. 63/190,990, filed on May 20, 2021.

(51) Int. Cl.
    *B66F 9/075* (2006.01)
    *B60R 16/023* (2006.01)
    (Continued)

(52) U.S. Cl.
    CPC ........ *B66F 9/07581* (2013.01); *B60R 16/023* (2013.01); *G05D 1/0016* (2013.01);
    (Continued)

(58) Field of Classification Search
    CPC . B66F 9/07581; B60R 16/023; G05D 1/0016; G05D 1/0022; G06F 3/0488;
    (Continued)

(56) References Cited

U.S. PATENT DOCUMENTS 8,825,289 B2      9/2014  Daly et al.
8,970,363 B2 *    3/2015  Kraimer ............... G05D 1/0033
                                                       180/315
(Continued)

FOREIGN PATENT DOCUMENTS

CN          104648285 B        1/2018
CN          209456029 U       10/2019

OTHER PUBLICATIONS

International Search Report and Written Opinion of the International Searching Authority dated Sep. 19, 2022; International Application No. PCT/US2022/030196; European Patent Office; Rijswijk, Netherlands.

(Continued)

*Primary Examiner* — Mohamed Abdo Algehaim
(74) *Attorney, Agent, or Firm* — Stevens & Showalter LLP

(57) ABSTRACT

A materials handling vehicle comprises a distributed processor system including a vehicle network that facilitates an exchange of information with vehicle electronic components, and a distributed multi-processor vehicle control architecture. The distributed multi-processor vehicle control architecture includes an embedded information core having a core processor communicably coupled to the vehicle network, and a tablet having a tablet processor, where the tablet is communicably couplable to, and detachable from the distributed multi-processor vehicle control architecture. When the tablet is detached from the distributed multi-processor vehicle control architecture, the core processor functions as a primary processor that communicates with vehicle electronic components by communicating therewith across the vehicle network. When the tablet is communicably attached to the distributed multi-processor vehicle control architecture, the tablet processor functions as the pri- (Continued)

mary processor, and the core processor functions as a subordinate processor.

19 Claims, 10 Drawing Sheets

(51) Int. Cl.

| | |
|---|---|
| *G05D 1/00* | (2024.01) |
| *G06F 3/0488* | (2022.01) |
| *H04W 4/40* | (2018.01) |
| *H04W 12/03* | (2021.01) |
| *H04W 80/06* | (2009.01) |

(52) U.S. Cl.
CPC ......... *G05D 1/0022* (2013.01); *G06F 3/0488* (2013.01); *H04W 4/40* (2018.02); *H04W 12/03* (2021.01); *H04W 80/06* (2013.01)

(58) Field of Classification Search
CPC ....... H04W 4/40; H04W 12/03; H04W 80/06; H04W 12/06; H04W 12/10; H04W 84/12; H04L 67/10; H04L 67/12; H04L 67/34; H04L 69/08; H04L 67/125; H04L 9/40
USPC .......................................................... 701/36
See application file for complete search history.

(56) References Cited

U.S. PATENT DOCUMENTS

| | | | | |
|---|---|---|---|---|
| 9,003,500 | B2 * | 4/2015 | Oglesbee | .............. H04L 67/125 707/610 |
| 9,523,582 | B2 * | 12/2016 | Chandrasekar | ........ G01C 21/20 |
| 10,242,562 | B2 | 3/2019 | Steinmetz | |
| 10,762,409 | B2 * | 9/2020 | Swift | ................. G06K 19/0703 |
| 10,820,360 | B1 * | 10/2020 | Glaenzer | .............. H04W 48/16 |
| 11,874,128 | B2 * | 1/2024 | Moore | ................... G01C 21/36 |
| 2013/0179700 | A1 * | 7/2013 | Toda | ...................... G06F 1/3287 713/300 |
| 2015/0135336 | A1 * | 5/2015 | Arasavelli | ............. H04L 63/102 726/29 |
| 2016/0034146 | A1 * | 2/2016 | Daly, Jr. | ............. G06F 3/04842 715/735 |
| 2017/0017392 | A1 * | 1/2017 | Castaneda | .................. G06F 3/02 |
| 2017/0090473 | A1 * | 3/2017 | Cooper | ................. H04W 76/11 |
| 2017/0257227 | A1 * | 9/2017 | Endo | ...................... H04W 76/10 |
| 2017/0299633 | A1 * | 10/2017 | Pietrowicz | .......... H04L 63/0254 |
| 2018/0060715 | A1 * | 3/2018 | Swift | ...................... H04L 67/125 |
| 2018/0060831 | A1 * | 3/2018 | Swift | ...................... H04W 4/02 |
| 2018/0143731 | A1 * | 5/2018 | Ochenas | .............. B66F 9/0755 |
| 2018/0143734 | A1 * | 5/2018 | Ochenas | .............. B66F 17/003 |
| 2018/0276909 | A1 * | 9/2018 | Harshbarger | .......... G07C 5/008 |
| 2018/0288816 | A1 * | 10/2018 | Borges | ................... H04W 4/44 |
| 2020/0115195 | A1 * | 4/2020 | Lee | ...................... G06V 10/235 |
| 2020/0254875 | A1 * | 8/2020 | Strandberg | ............. B60K 35/00 |
| 2022/0283582 | A1 * | 9/2022 | Crinklaw | ............... H04W 4/90 |
| 2023/0292663 | A1 * | 9/2023 | Hodson | ................ A01D 41/141 701/50 |

OTHER PUBLICATIONS

Sulcs, Evan; Examination Report No. 1 dated Mar. 21, 2025; Australian Application No. 2022276420: IP Australia.
Grothaus, Brent; Related Divisional Application entitled "Truck-Tablet Interface" filed Dec. 12, 2025; U.S. Appl. No. 19/417,456; United States Patent and Trademark Office; Alexandria, Virginia.
Grothaus, Brent; Related Divisional Application entitled "Truck-Tablet Interface" filed Dec. 12, 2025; U.S. Appl. No. 19/417,484 United States Patent and Trademark Office; Alexandria, Virginia.
Larracilla, Edgar Flores; First Office Action dated Nov. 26, 2025; Mexican Application No. MX/a/2023/013768; Mexican Institute of Industrial Property; Mexico City, Mexico.

* cited by examiner

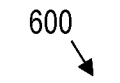
600
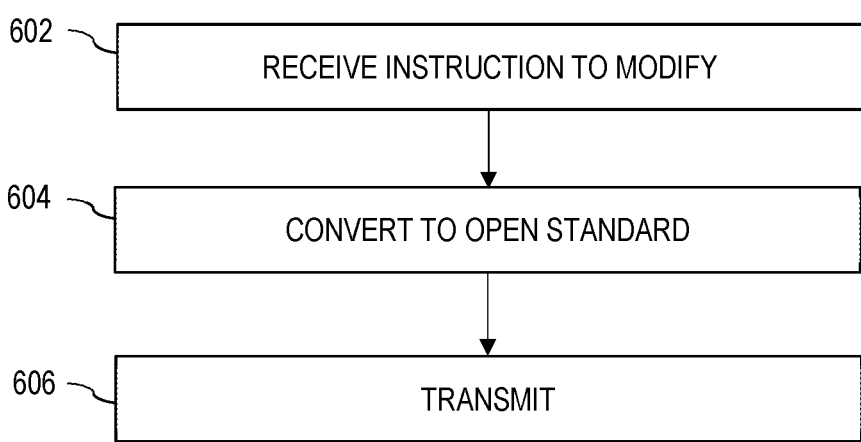
602 — | RECEIVE INSTRUCTION TO MODIFY |
604 — | CONVERT TO OPEN STANDARD |
606 — | TRANSMIT |
FIG. 6

700

702

RECEIVE FROM REMOVABLE TABLET THAT IS COMMUNICABLY COUPLED TO MATERIALS HANDLING VEHICLE, AN INSTRUCTION TO MODIFY OPERATING CONDITION OF ELECTRICAL COMPONENT OF MATERIALS HANDLING VEHICLE, WHERE INSTRUCTION IS COMMUNICATED ACROSS OPEN STANDARD COMMUNICATION PROTOCOL

704

DETERMINE WHETHER REMOVABLE TABLET IS COMMUNICABLY COUPLED TO MATERIALS HANDLING VEHICLE VIA WIRED OPEN STANDARD COMMUNICATION PROTOCOL, WIRELESS OPEN STANDARD COMMUNICATION PROTOCOL, OR BOTH

706

PRIORITIZE WIRED OPEN STANDARD COMMUNICATION PROTOCOL OVER WIRELESS OPEN STANDARD COMMUNICATION PROTOCOL WHERE WIRED OPEN STANDARD COMMUNICATION PROTOCOL IS DETECTED AS BEING ACTIVE

708

CONVERT BY PROCESSOR ON MATERIALS HANDLING VEHICLE, INSTRUCTION TO MODIFICATION COMMAND TO MODIFY ASSOCIATED ELECTRICAL COMPONENT OF MATERIALS HANDLING VEHICLE ACCORDING TO PARAMETER EXTRACTED FROM INSTRUCTION

710

TRANSMIT MODIFICATION COMMAND TO ELECTRICAL COMPONENT OF MATERIALS HANDLING VEHICLE VIA VEHICLE NETWORK OF MATERIALS HANDLING VEHICLE, WHEREIN ELECTRICAL COMPONENT RECEIVES MODIFICATION COMMAND AND TRANSFORMS OPERATING STATE OF ELECTRICAL COMPONENT SO AS TO CAUSE OVERALL MODIFICATION OF OPERATION OF MATERIALS HANDLING VEHICLE

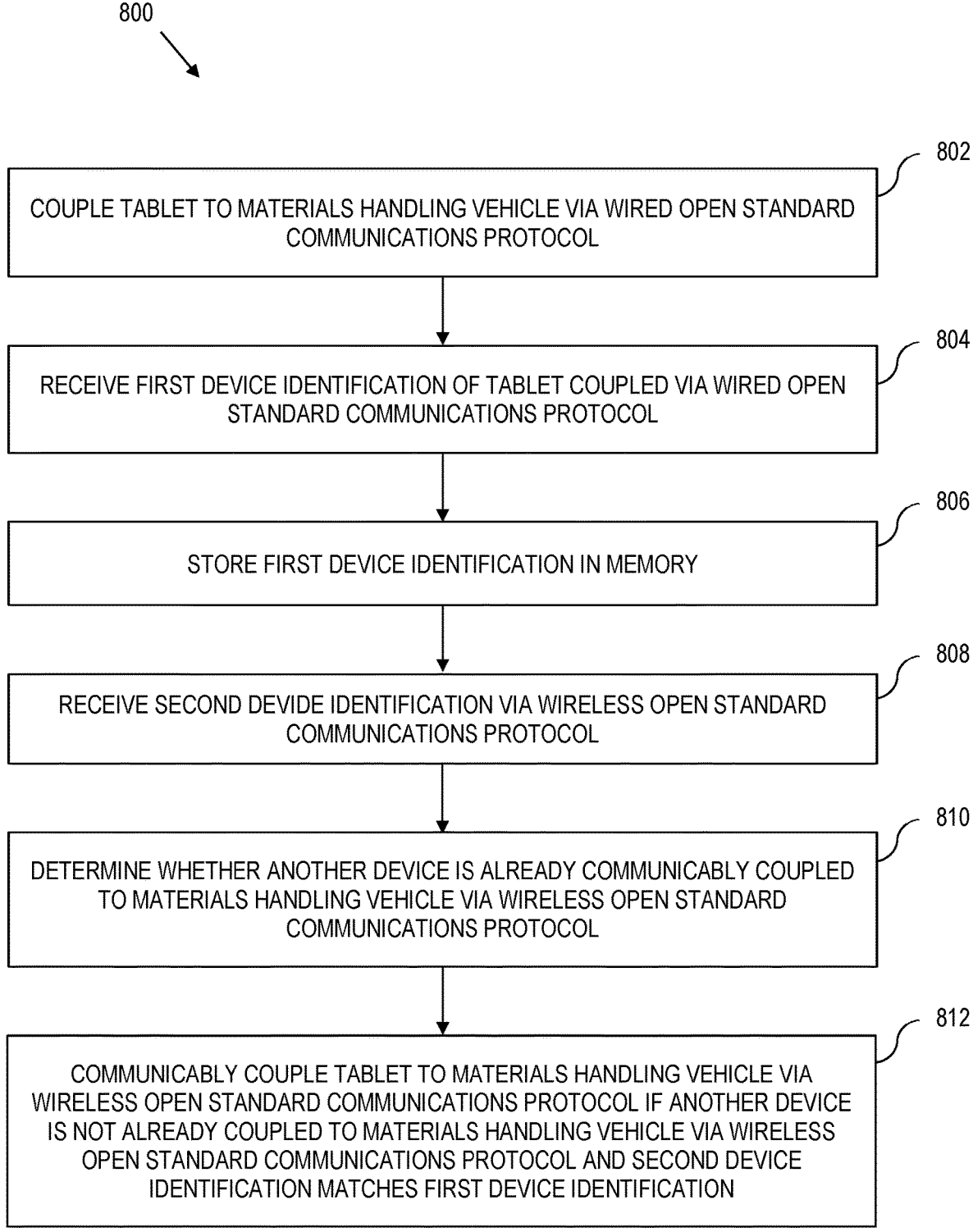

802

COUPLE TABLET TO MATERIALS HANDLING VEHICLE VIA WIRED OPEN STANDARD COMMUNICATIONS PROTOCOL

804

RECEIVE FIRST DEVICE IDENTIFICATION OF TABLET COUPLED VIA WIRED OPEN STANDARD COMMUNICATIONS PROTOCOL

806

STORE FIRST DEVICE IDENTIFICATION IN MEMORY

808

RECEIVE SECOND DEVIDE IDENTIFICATION VIA WIRELESS OPEN STANDARD COMMUNICATIONS PROTOCOL

810

DETERMINE WHETHER ANOTHER DEVICE IS ALREADY COMMUNICABLY COUPLED TO MATERIALS HANDLING VEHICLE VIA WIRELESS OPEN STANDARD COMMUNICATIONS PROTOCOL

812

COMMUNICABLY COUPLE TABLET TO MATERIALS HANDLING VEHICLE VIA WIRELESS OPEN STANDARD COMMUNICATIONS PROTOCOL IF ANOTHER DEVICE IS NOT ALREADY COUPLED TO MATERIALS HANDLING VEHICLE VIA WIRELESS OPEN STANDARD COMMUNICATIONS PROTOCOL AND SECOND DEVICE IDENTIFICATION MATCHES FIRST DEVICE IDENTIFICATION

FIG. 8

TRUCK-TABLET INTERFACE

CROSS REFERENCE TO RELATED APPLICATIONS

This application is a divisional application of U.S. patent application Ser. No. 17/664,256, filed May 20, 2022, entitled TRUCK-TABLET INTERFACE, which claims the benefit of U.S. Provisional Patent Application Ser. No. 63/190,990, filed May 20,2021, having the title TRUCK-TABLET INTERFACE, the entire disclosures of which are hereby incorporated herein by reference.

BACKGROUND

The present embodiments relate in general to a materials handling vehicle having a computer-controlled interface, and in particular, to a materials handling vehicle that incorporates a conventional tablet computer, e.g., a ruggedized tablet, as an interface.

Materials handling vehicles are commonly used for picking stock in warehouses and distribution centers. Such vehicles typically include a power unit and a load handling assembly, which may include load carrying forks. In a typical warehouse implementation, a management system directs the tasks of the materials handling vehicle operator, e.g., by instructing the materials handling vehicle operator where and/or how to pick, pack, put away, move, stage, process or otherwise move items within a facility.

BRIEF SUMMARY

According to aspects of the present disclosure, a materials handling vehicle communication system comprises a vehicle network, an embedded information core, and a tablet. The vehicle network facilitates an exchange of information with electronic components associated with a materials handling vehicle. Thus, for example, the vehicle network can be implemented as a network that is integral to the materials handling vehicle, such as a CAN bus, RS422 bus, etc. The embedded information core includes a core processor communicably coupled to the vehicle network. In this regard, the embedded information core may be integral to the materials handling vehicle. Also, the tablet includes a tablet processor. When the tablet is communicably coupled to the embedded information core, the tablet processor functions in cooperation with the core processor, defining a distributed multi-processor vehicle control architecture where the core processor and the tablet processor cooperate to exchange at least one vehicle parameter between the tablet and an associated one of the vehicle electronic components.

In some embodiments, when the tablet is communicably coupled to the embedded information core, the tablet processor functions as an auxiliary processor to the core processor defining a distributed multi-processor vehicle control architecture where the core processor and auxiliary processor cooperate to exchange at least one vehicle parameter between the tablet and an associated one of the electronic components.

According to further aspects of the present disclosure, a process for modifying an operation of a materials handling vehicle is provided. The process comprises receiving an electrical signal representing an instruction to modify an operating condition of the materials handling vehicle. In this regard, the instruction is received from a tablet, and the instruction is communicated via an open standard communication protocol. In some embodiments, the open standard communication protocol is open, but the information itself is confused or encrypted such that it cannot be readily or easily intercepted, understood, or otherwise used in un-intended ways. The process also comprises converting the instruction received via the open standard communication protocol to a modification command to modify an electrical component of the materials handling vehicle according to a parameter extracted from the instruction. Also, the process comprises transmitting the modification command to the electrical component of the materials handling vehicle via a vehicle network of the materials handling vehicle. Here, the electrical component receives the modification command and transforms an operating state of the electrical component so as to cause an overall modification of the operation of the materials handling vehicle.

According to yet further aspects of the present disclosure, a process for modifying operation of a materials handling vehicle is provided. The process comprises receiving across a vehicle network, by an embedded information core, an instruction to modify an operating condition of the materials handling vehicle. Here, the vehicle network facilitates an exchange of information with vehicle electronic components of the materials handling vehicle. Moreover, the embedded information core is communicably coupled to the vehicle network for communication with the vehicle electronic components. Also, the instruction is received from a tablet via an open standard communication protocol. The process further comprises converting the instruction received from the tablet via the open standard communication protocol, to a modification command to modify an associated electrical component of the materials handling vehicle according to a parameter extracted from the instruction. Also, the process comprises transmitting the modification command to the electrical component of the materials handling vehicle via a vehicle network of the materials handling vehicle. In this regard, the electrical component receives the modification command and transforms an operating state of the electrical component so as to cause an overall modification of the operation of the materials handling vehicle.

Yet additionally, according to aspects of the present disclosure, a materials handling vehicle communication system is provided. The materials handling vehicle communication system comprises a vehicle network that facilitates an exchange of information with vehicle electronic components of a materials handling vehicle. The materials handling vehicle communication system also comprises an embedded information core that is communicably coupled to the vehicle network for communication with the vehicle electronic components. Also, the materials handling vehicle communication system comprises a tablet that mounts to the materials handling vehicle. Here, the tablet is configured to communicate an electrical signal to the embedded information core without using the vehicle network. Also, the electrical signal represents an instruction to modify an operating condition of the materials handling vehicle. In this regard, the instruction is communicated via an open standard communication protocol. The embedded information core converts the received instruction into a modification command to modify an electrical component of the materials handling vehicle according to a parameter extracted from the instruction. Also, the embedded information core transmits the modification command to the vehicle electronic component across the vehicle network, and the vehicle electronic component receives the modification command and transforms an operating state thereof, so as to cause an overall modification of the operation of the materials handling vehicle.

According to further aspects of the present disclosure, a process is provided for securing access to a materials handling vehicle. The process is carried out by coupling a tablet to a materials handling vehicle via a wired open standard. The process also includes receiving a first device identification of the tablet coupled via the wired open standard, and storing the first device identification in memory. Also, the process includes receiving a second device identification via a wireless open standard, and determining whether another device is already communicably coupled to the materials handling vehicle via the wireless open standard. The process yet further includes communicably coupling the tablet to the materials handling vehicle via the wireless open standard if another device is not already coupled to the materials handling vehicle via the wireless open standard and the second device identification matches the first device identification.

BRIEF DESCRIPTION OF THE SEVERAL VIEWS OF THE DRAWINGS

FIG. 6 is a flow chart illustrating a process for communicating commands to a materials handling vehicle;

FIG. 7 is a flow chart illustrating a process for modifying operation of a materials handling vehicle, according to aspects of the present disclosure;

FIG. 8 is a flow chart illustrating a process for securing access to a materials handling vehicle, according to aspects of the present disclosure.

DETAILED DESCRIPTION

Figure 1:
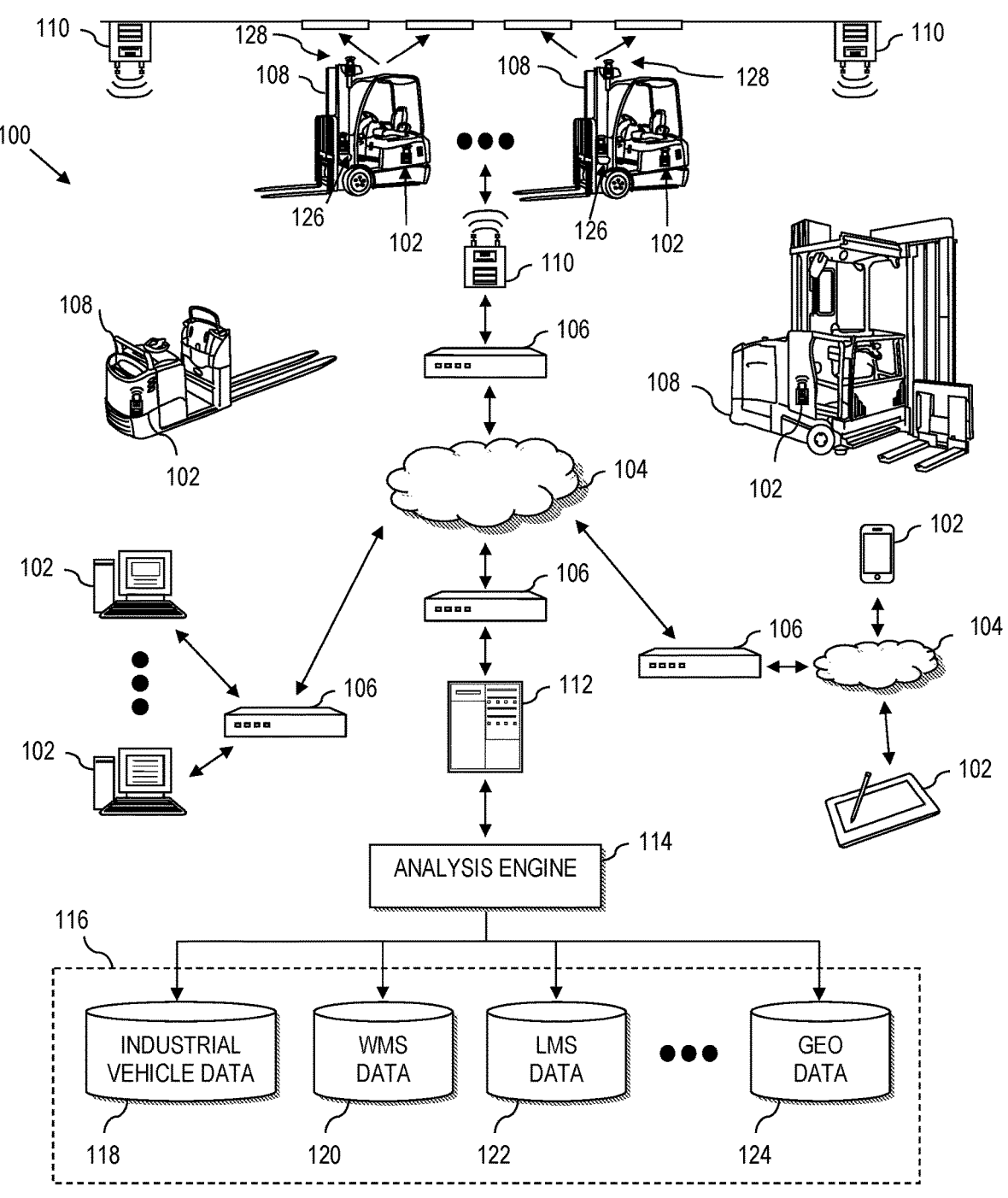
FIG. 1 is a block diagram of a materials handling vehicle computing enterprise, according to aspects of the present disclosure.

According to various aspects herein, a removable, replaceable, processing device (hereinafter referred to as a "tablet" for convenience) integrates with a materials handling vehicle, e.g., so as to function as if the tablet were an original equipment manufacturer (OEM) component.

As used herein, the term "tablet" is meant to include a portable device, such as a tablet, a general-purpose tablet, a ruggedized tablet, computer, smartphone, laptop, purpose-driven appliance, internet of things (IoT) device, special purpose computing device, an information processing and/or collecting device, or other device capable of communicating over the network 104 and performing one or more of the functions as described herein.

In practical applications, the portable device, i.e., the tablet, typically includes a touch display or a non-touch display. The portable device may also optionally include one or more user input controls (e.g., a set of user input controls, e.g., buttons, switches, encoders, or combination thereof). In this regard, the portable device can run an off-the-shelf operating system, such as Android (Android is a registered trademark of Google, Inc., a Delaware Corporation), Windows (Windows is a registered trademark of Microsoft Corporation, a Delaware Corporation), Linux (Linux is a registered trademark of William R. Della Croce, Jr. an individual of Massachusetts), MacOS (MacOS is a registered trademark of Apple, Inc., a California Corporation), iOS (iOS is a registered trademark of Cisco Technology, Inc., a California Corporation), etc.

The processing device can also run a proprietary operating system. The processing device also includes data processing circuitry, including a processor and memory. Yet further, the processing device includes connectivity features, including wireless connectivity, e.g., via Wi-Fi (Wi-Fi is a registered trademark of Wi-Fi Alliance, a California Corporation), Bluetooth (the Bluetooth word mark and logo are registered trademarks of Bluetooth SIG, a Delaware Corporation), ultra-wideband, cellular (including 5G), etc. Connectivity features can also include wired connectivity, e.g., via USB, serial port, etc.

In some embodiments, the tablet effectively replaces one or more normally required embedded and/or vehicle-mounted components. For instance, in some embodiments, the tablet decouples materials handling vehicle hardware (e.g., traction controller, hydraulics controller, and other conventional vehicle electronic systems) from technology hardware (e.g., processor chip, memory, transceiver(s), touch screen technology, user inputs/outputs, etc.) typically required to interface such materials handling vehicle hardware to an end user (e.g., operator, service technician, or other user), This approach effectively utilizes the tablet as a portable, replaceable device for the technology hardware portions of an electronic system that are anticipated to change with technology cycles (wireless radios, display/touchscreen, processing power, memory speed and/or memory size, etc.), allowing for a flexible architecture that may be updated rapidly and with less effort than an upgrade of a fully embedded approach.

In this regard, when properly coupled, the tablet integrates with the electronic components, e.g., native materials handling vehicle electronics, original equipment manufacturer (OEM) electronics, electronic add-ons, electronic peripheral devices, other electronics on or associated with the materials handling vehicle, or combinations thereof. As a few non-limiting examples, the tablet can function as a graphical user interface, a redundant display, a dual or auxiliary display, a communication interface for exchanging information with devices remote to the materials handling vehicle, a redundant or auxiliary communications device, a processing device to control certain functions of the materials handling vehicle, combinations thereof, etc.

Additionally, in some embodiments, the tablet can display data generated by other control electronics on or associated with the materials handling vehicle, display data from an accessory associated with the materials handling vehicle, display data wirelessly received from a remote device such as a remote server or other electronic device, directly and locally compute and display data, or combinations thereof. This allows, for instance, vehicle operational data to be decentralized from a normal instrument cluster or dashboard, thus allowing for example, the operator to position the display of vehicle data where convenient for tasks that require repositioning within an operator's compartment of the materials handling vehicle.

In some embodiments, the tablet can send data, including commands, to electronic component(s) to control functions of the materials handling vehicle, receive commands from the materials handling vehicle to carry out processing within the tablet, send information to a remote device, such as a remote server or other electronic device, receive commands from a remote device to carry out processing within the tablet, or combinations thereof.

Thus, the tablet can replace some of the functionality typically reserved for an embedded system (e.g., telematics module, processing module, user I/O module, etc.), which has limitations in functionality and development cycle. In this regard, the tablet effectively replaces many components otherwise required in an embedded system. However, the tablet is removable from the materials handling vehicle, and swappable with a different tablet instance, allowing for ready upgrade and/or replacement of multiple technology systems with a single swap.

In other embodiments, the tablet is delegated to non-operation critical processing, such that a materials handling vehicle functions normally and is fully operational without the tablet. However, when the tablet integrates with an embedded system or other electronics of the materials handling vehicle, enhanced processing and/or operating capabilities, characteristics, information presentation, information processing, combinations thereof, etc., are implemented.

By collocating technology features including hardware and software that are updated and/or need serviced on relatively fast cycles (e.g., touchscreen, processor, memory, user interacting software, etc., in the tablet)—this could be measured in cycles ranging from months to a few years, and by collocating electronic features that are more robust but more difficult to upgrade, repair or change (e.g., vehicle network bus interface, vehicle configuration manager, vehicle supervisory processor, etc., that are native integrated vehicle components)-this could be measured in cycles ranging from five to ten years, up to the life of the vehicle, an improved overall vehicle computer architecture is provided. This improved vehicle computer architecture improves conventional vehicle computer systems beyond hardware upgradability by facilitating security features that can be readily monitored, updated, and upgraded; provides for effective, persistent cyber-vulnerability monitoring and patching; and improves the efficiency and maximizes life of processing hardware by distributing tasks in a multi-processor environment, enabling task sharing, parallel processing, redundant communication, and other technology features described more fully herein.

System Overview

Referring now to the drawings and in particular to FIG. 1, a schematic diagram illustrates a materials handling vehicle system 100 according to various aspects of the present disclosure. The materials handling vehicle system 100 is a special purpose (particular) computing environment that includes a plurality of hardware-equipped processing devices 102 that are linked together by one or more network(s) 104.

The network 104 provides communications links between the various processing devices 102 and may be supported by networking components 106 that interconnect the processing devices 102, including for example, routers, hubs, firewalls, network interfaces, wired or wireless communications links and corresponding interconnections, cellular stations and corresponding cellular conversion technologies (e.g., to convert between cellular and TCP/IP, etc.). Moreover, the network(s) 104 may comprise connections using one or more network configurations, examples of which include intranets, extranets, local area networks (LAN), wide area networks (WAN), wireless networks (Wi-Fi), the Internet, including the world wide web, cellular and/or other arrangements for enabling communication between the processing devices 102, etc.

A processing device 102 can be implemented as a server, computer, tablet, smartphone, purpose-driven appliance, internet of things (IOT) device, special purpose computing device, an information processing and/or collecting device on a vehicle, an information processing and/or collecting device on a machine (fixed or mobile), or other device capable of communicating over the network 104, Particularly, a processing device 102 is provided on one or more materials handling vehicles 108. In the example configuration illustrated, a processing device 102 on a materials handling vehicle 108 wirelessly communicates through one or more access points 110 to a corresponding networking component 106, which serves as a connection to the network(s) 104. Alternatively, a materials handling vehicle 108 can be equipped with cellular or other suitable wireless technology that allows the processing device 102 on the materials handling vehicle 108 to communicate directly with a remote device (e.g., over the network(s) 104).

The system 100 also includes a processing device implemented as a server 112 (e.g., a web server, file server, and/or other processing device) that supports a platform 114 and corresponding data sources (collectively identified as data sources 116).

Materials handling vehicles 108 are typically operated in a work environment such as a warehouse, distribution center, retail establishment, etc. As such, the platform 114 provides materials handling vehicle monitoring, management, control, or combinations thereof.

In the illustrative example, the data sources 116, which need not be co-located, assemble data that serves the benefit of an enterprise, from multiple, different domains. In the illustrated example, data sources 116 include a materials handling vehicle information data source 118 that collects data from the operation of materials handling vehicles 108, e.g., in a materials handling vehicle domain. By way of example, the materials handling vehicle information data source 118 can store electronic vehicle records, e.g., received wirelessly, from a fleet of materials handling vehicles 108 via access points 110 or otherwise. In this regard, each electronic vehicle record can comprise travel-related data, operational data, maintenance data, observational data, configuration data, or other information recorded by, collected by, generated by, etc., a processing device 102 on an associated materials handling vehicle 108 being operated in the work environment.

Data sources 116 can also include a management system data source 120, e.g., a warehouse management system (WMS). The WMS relates information to the movement and tracking of goods within the work environment in a WMS domain.

Moreover, data sources 116 can include any other data source(s) needed by the work environment, such as a labor management system (LMS) 122, geo-location system 124, etc. The above list is not exhaustive and is intended to be illustrative only.

Materials Handling Vehicle

Figure 2:
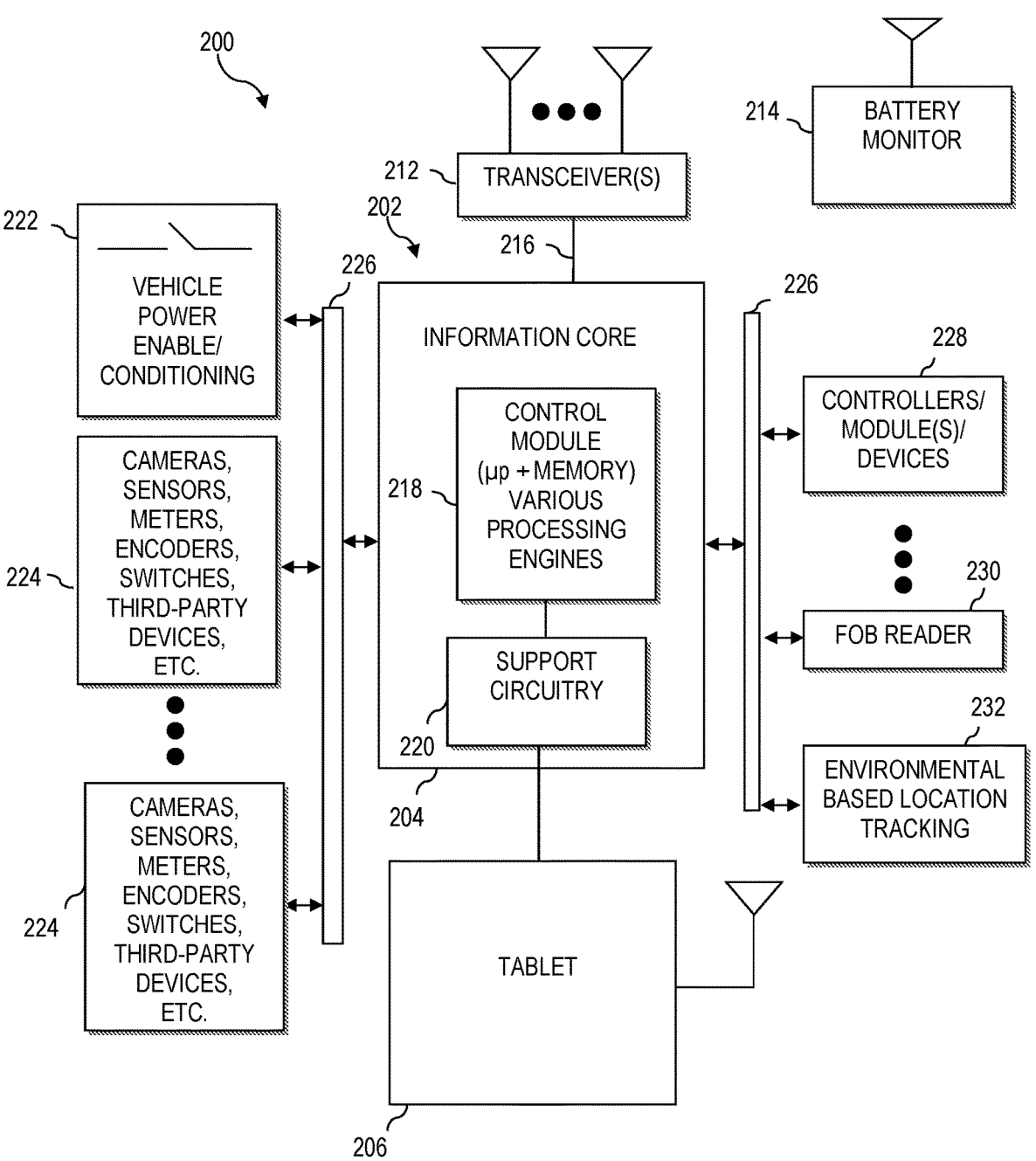
FIG. 2 is a block diagram of a special purpose processing device on a materials handling vehicle, according to aspects of the present disclosure herein.

Referring to FIG. 2, a system 200 is illustrated, which illustrates select electronic components on a materials handling vehicle 108 (FIG. 1). By way of example, a processing device 202 is illustrated, which can be installed onto or provided native (OEM) to a materials handling vehicle. The processing device 202 is an example embodiment of a processing device 102 on the materials handling vehicle 108 in FIG. 1. Here, the processing device 202 is a special purpose, particular hardware device.

The illustrated processing device 202 is implemented as an embedded information core 204, which can interface with a tablet 206. The embedded information core 204 and tablet 206, when coupled together, define a distributed, multi-processor, vehicle control architecture.

Embedded Information Core

The embedded information core 204 is typically implemented as a native electronic embedded processing system. In some embodiments, the embedded system is a system that is permanently or semi-permanently mounted to a materials handling vehicle. That is, in some embodiments, the embedded information core 204 represents hardware intended to remain coupled to a corresponding materials handling vehicle. In this regard, the embedded information core 204 may be integrated directly into vehicle electronics, alone or in combination with other electronics. In alternative embodiments, the embedded information core 204 is packaged into a housing that can mount to, attach to, or otherwise be installed onto a corresponding materials handling vehicle.

In an illustrative example, the embedded information core 204 may optionally be communicably connected to, or may optionally include integrated therein, a transceiver 212 for wireless communication. In practice, the transceiver 212 can implement one or more wireless communication technologies (e.g., Wi-Fi, Bluetooth, ultra-wideband (UWB), cellular, radio frequency (RF), infrared (IR), any other wireless technology or combinations thereof). Moreover, each technology can include one or more antenna, e.g., for redundancy, for location/position determination, for reliability, combinations thereof, etc. For instance, the transceiver 212 may be able to communicate with a remote server, e.g., server 112 of FIG. 1 via 802.11 across the access points 110 of FIG. 1. For instance, using a cellular transceiver communicating with a 5G router or other form of cellular to IP (internet protocol) bridge, the transceiver 212 may be able to use a cellular signal to communicate directly with a remote server, e.g., a manufacturer server.

As an illustrative example, the transceiver 212 may include a communication technology such as Bluetooth. This allows the information core 204 to communicate with proximate Bluetooth enabled devices. For instance, the corresponding materials handling vehicle may include a battery as a source of energy. A battery monitor 214 may be coupled to the battery to measure and log battery characteristics, such as current discharges, temperature, resistance, etc., for measuring and/or computing remaining battery charge, battery state of health, battery state of charge, etc. Here, the battery monitor 214 can include a Bluetooth transceiver that pairs with transceiver 212 so that the information core 204 and the battery monitor 214 can share information.

As another example, in addition to or in lieu of Bluetooth, the transceiver 212 may include an ultra-wideband transceiver. The ultra-wideband transceiver can be used to create temporary, local mesh networks to facilitate communication with electronic badges for truck and pedestrian tracking, to communicate with ultra-wideband enabled device(s), such as anchors, tags, talking markers, etc. Here, the ultra-wideband transceiver can include multiple antennae (e.g., two or more antennae) so that the information core 204 can carry out localization, position determination, distance determination, distance, direction, and orientation measurements of nearby corresponding ultra-wideband badges, etc.

As still another example, the transceiver may include a 5G radio for communication with a 5G network, which may be local (e.g., within a facility), external to the facility, etc.

In an example embodiment, the transceiver 212 connects to the processing device 202 via a suitable electrical connection 216, e.g., an Ethernet connection, USB connection, etc. However, the transceiver 212 can integrate into the information core 204 using other connection methods, or the transceiver 212 may be omitted entirely. For instance, in some embodiments, the transceiver 212 is a component of the materials handling vehicle. In other embodiments, the transceiver 212 is integrated into the information core 204. In yet other embodiments, the information core itself does not include a transceiver 212. Here, one or more transceivers can be integrated in or otherwise coupled to the tablet 206. In this regard, the transceiver(s) of the tablet 206 can implement any combination of functionality described with reference to the transceiver(s) 212.

In still other embodiments, there can be multiple transceivers or transceiver instances, e.g., for different purposes, for redundancy, to support vehicle functions when a tablet is not available, to support different communication protocols, or combinations thereof. In this example embodiment, both the embedded information core 204 and the tablet 206 can each include at least one transceiver, which can implement the same or different communication protocols.

The embedded information core 204 also comprises data processing circuitry, e.g., illustrated as a controller 218. The controller 218 includes a processor coupled to memory for implementing computer instructions, including the relevant processes, or aspects thereof, as set out and described more fully herein. The controller 218 can also include other necessary processing circuitry and software, such as for implementing a display engine, camera processing engine, data processing engine(s), etc.

Moreover, the memory of the controller 218 can include memory that stores processing instructions, as well as memory for data storage, e.g., to implement one or more databases, data stores, registers, arrays, etc.

The embedded information core 204 can also include additional support circuitry 220 necessary to support the functionality of the controller 218. Example additional circuitry 220 can include by way of non-limiting example, video ports, camera ports, input/output ports, interfaces (e.g., a universal serial bus interface, pogo pin interface, Bluetooth interface, network interface(s), etc.), event stacks, processing stacks, configuration data management, client management, event management, etc.

The processing device 202 can also optionally include or otherwise communicate with vehicle power enabling circuitry 222. The vehicle power enabling circuitry 222 is controlled by the controller 218 to selectively enable or disable the materials handling vehicle 108 and/or selectively enable or disable select components of the materials handling vehicle 108. In certain implementations, the controller 218 controls the vehicle power enabling circuitry 222 to partially enable the materials handling vehicle for operation, or fully enable the materials handling vehicle for operation, e.g., depending upon proper operator login or service technician login. For instance, the materials handling vehicle power enabling circuitry 222 can provide selective power to components via a suitable power connection, or otherwise command certain vehicle components not to respond to vehicle operator control via vehicle messaging, e.g., across one or more vehicle communication busses.

In certain implementations, the information core 204 includes a monitoring input/output (I/O)) capability to communicate via wired or wireless connection with peripheral devices mounted to or otherwise on the materials handling vehicle, such as cameras, sensors, lasers, meters, encoders, light bars, switches, Internet of things (IOT) devices etc. (collectively represented by reference numeral 224). The information core 204 can also communicate via wired or wireless connection with third-party devices 224 such as radio-frequency identification (RFID) scanners, displays, bar code scanners, or other devices.

The information core 204, and in particular, the controller 218 is coupled to and/or communicates with other materials handling vehicle system components via a suitable materials handling vehicle network 226, e.g., at least one bus. The materials handling vehicle network 226 is any wired or wireless network, bus (or busses) or other communications capability (or combination of multiple, independent networks, busses or other communications capabilities) that allows electronic components of the materials handling vehicle 108 to communicate with each other. As an example, the vehicle network 226 may comprise one or more controller area network (CAN) bus (or CAN busses), Zigbee (Zigbee is a registered trademark of Connectivity Standards Alliance, a California Corporation), Bluetooth, Local Interconnect Network (LIN), time-triggered data-bus protocol (TTP), RS422, Ethernet, USB, other suitable communication strategy, or combinations thereof.

For instance, the controller 218 can communicate with vehicle electronic components such as controllers (hydraulic, traction, etc.), modules such as a battery monitor, devices such as impact sensors, etc., location tracking systems, etc., (collectively devices 228) by communicating across the vehicle network 226. Other example devices 228 can include displays, light bars, alarms, sensor systems, navigation systems, IoT devices, data collection devices, communication devices, user interaction devices, etc.

The controller 218 of the processing device 202 can also communicate with a fob reader 230 (or keypad, card reader or any other device) for receiving operator credentials.

According to yet further aspects of the present disclosure, the embedded information core 204 can communicate with a location tracking device or system 232 that is provided on the materials handling vehicle 108. The location tracking device or system 232 enables the materials handling vehicle 108 to be spatially aware of its location within a local space, e.g., within a warehouse.

Utilization of the vehicle network 226 enables seamless integration of the components of the materials handling vehicle 108 with the embedded information core 204, and in particular, the controller 218. By way of example, the controller 218 can facilitate the communication of information from any electronic peripheral devices or third-party devices 224, controller(s) such as device(s) 228, fob reader 230, location tracking device or system 232, etc., associated with the materials handling vehicle 108 that integrate with and can communicate over the network system 226. Thus, the embedded information core 204 connects with, understands and is capable of communication with vehicle components, such as controllers, modules, devices, bus enabled sensors, displays, lights, light bars, sound generating devices, headsets, microphones, haptic devices, peripheral devices, etc.

Tablet

As noted above, the tablet 206 can be embodied as any suitable portable device, such as a tablet, a general-purpose tablet, a ruggedized tablet, computer, smartphone, purpose-driven appliance, internet of things (IoT) device, special purpose computing device, an information processing and/or collecting device, or other device capable of communicating over the network 104 and performing one or more of the functions as described herein.

In practical applications, the tablet 206 includes a touch display, a processor and memory. Yet further, the tablet 206 includes connectivity features, including wireless connectivity, e.g., via Wi-Fi, Bluetooth, ultra-wideband, cellular/5G, etc. Connectivity features can also include wired connections, e.g., USB, a serial port, etc., or a combination thereof.

In some embodiments, because the tablet 206 integrates with the information core 204, e.g., via support circuitry 220, the tablet 206 can be agnostic to any other devices that communicate with the information core 204. As such, the tablet 206 need not be aware of any network system protocols for communicating across or otherwise accessing the vehicle network system 226.

Although FIG. 2 schematically illustrates the tablet 206 communicably coupled to the embedded information core 204 via the support circuitry 220 (e.g., via a USB connection), in practice, the tablet 206 can communicate with the controller 218 of the embedded information core 204 via Bluetooth or other wireless technology, USB or other hard wired technology, a combination thereof, etc.

Figure 3A:
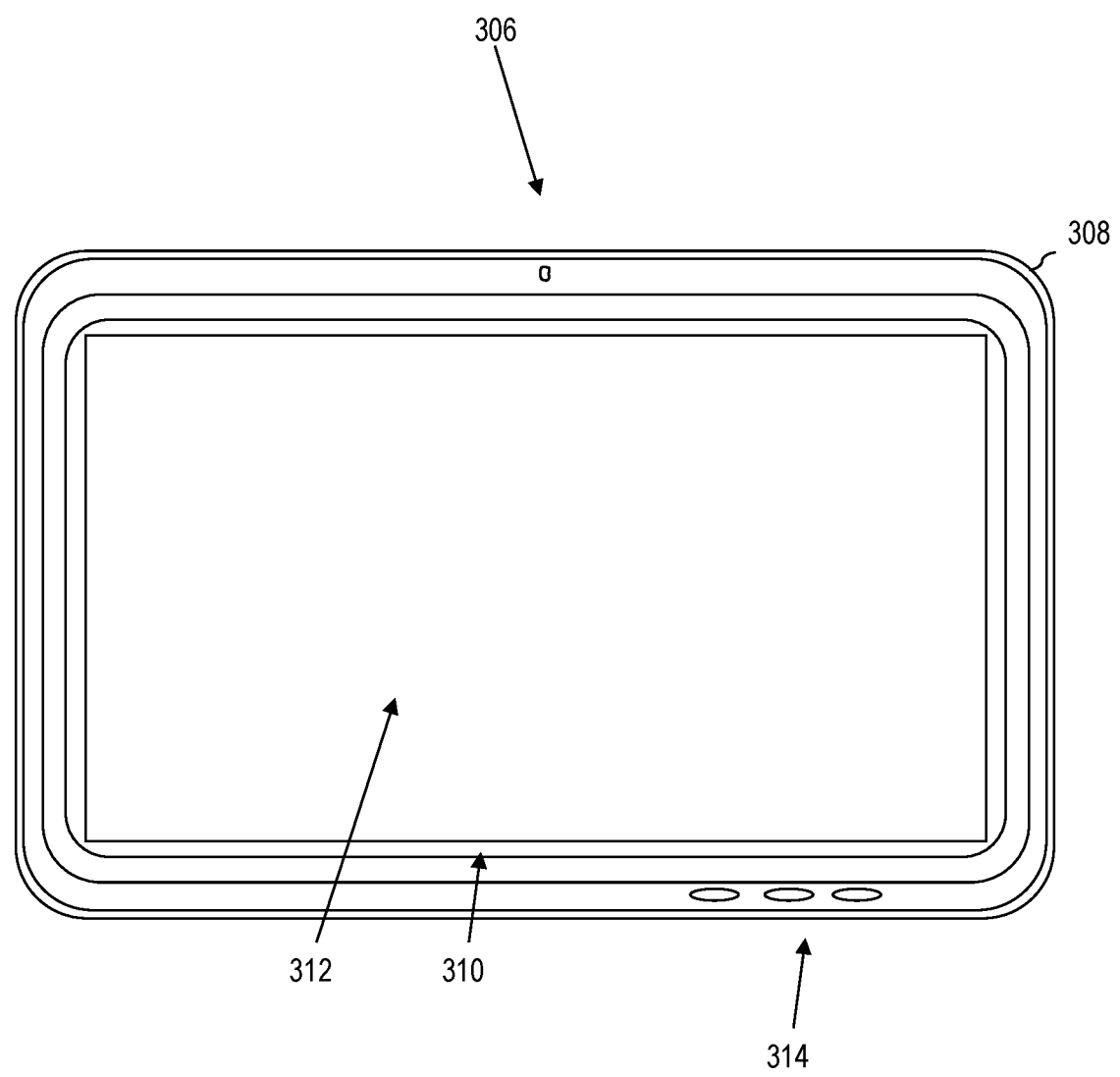
FIG. 3A is an example illustration of a tablet.

Referring briefly to FIG. 3A, a tablet 306 is illustrated, which can be utilized to implement the tablet 206 of FIG. 2. The tablet 306 includes a housing 308 having a front face 310 defining a display section 312 and an optional vehicle operator control section 314. In example embodiments, a touch screen display is provided within the display section 312 of the tablet 306. In this regard, the tablet 306 includes the appropriate technology to respond to gesture controls implemented by touching the screen, pressing against or releasing from the screen, swiping across the screen, gesturing over (but not contacting the screen), performing other gesture functions associated with the display, etc., (collectively referred to herein as gesture commands). In some embodiments, the display can respond to gesture commands that do not strictly require touching the display.

Also, in some embodiments, a set of controls is arranged within the vehicle operator control section 314 of the tablet 306. The vehicle operator control section 314 is optional, but where provided, can include buttons, switches, sliders, encoders, knobs, voice recognition, keypad, external controls connected to I/O such as a Bluetooth or USB keyboard, other forms of receiving vehicle operator input, combinations thereof, etc.

For instance, in an example implementation, a set of controls 314, e.g., function keys, is co-located with the touch screen display. The user input controls interact with, or control, elements in the graphical user interface as viewed on the touchscreen display, serve as input controls to apps running on the tablet 306, etc. The user input controls, where provided, can be programmed to function in specific manners, depending upon the implementation.

Figure 3B:
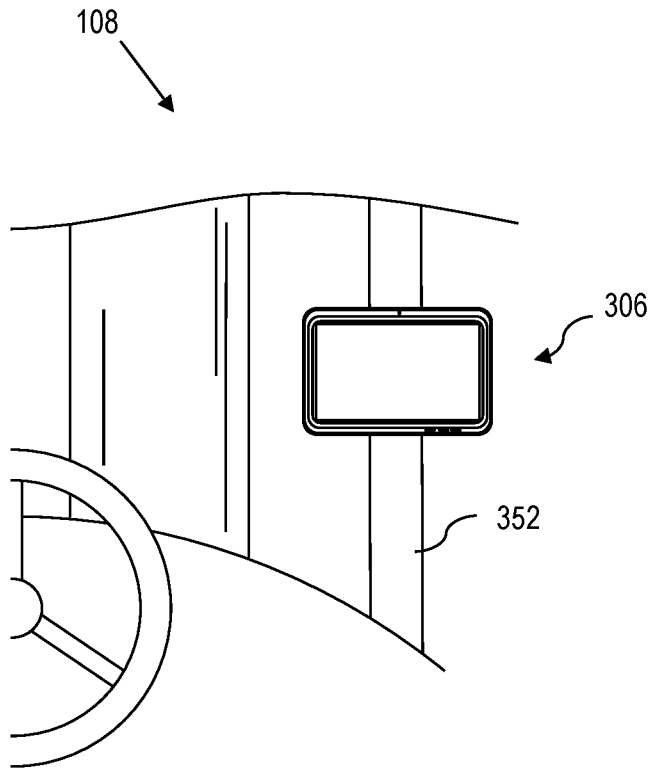
FIG. 3B is an illustration of the tablet of FIG. 3A mounted on a materials handling vehicle implemented as a forklift truck.

Referring to FIG. 3B, the tablet 306 of FIG. 3A is illustrated mounted to a support bar 352 of a materials handling vehicle 108 implemented as a sit down forklift for convenience of illustration. In practice, the tablet 306 can be mounted in, on, to, integrated with, or otherwise provided for various types of materials handling vehicles, including but not limited to a forklift truck, reach truck, stock picker, turret truck, tow tractor, rider pallet truck, walkie stacker truck, etc. Here, the housing of the graphical user interface 302 can be mounted to the inside or outside of the corresponding materials handling vehicle, e.g., via a mounting bracket, mounting bezel, casing, or other suitable structure.

In this regard, the size, shape, and other physical characteristics can vary depending upon the application. For instance, if the housing 308 of the tablet 306 is mounted inside a materials handling vehicle, e.g., to a dock, the front face 310 can conform to neighboring structures, e.g., instrument/control cluster, etc. Also, in some embodiments, additional support structures such as mounts, a harness, docking station, and/or other attachments may be provided if the tablet 306 is mounted to the materials handling vehicle, e.g., to the support bar 352. As such, the processing device herein is adaptable to multiple mounting options for different materials handling vehicle types and modes, including modes with or without an operator (e.g., operator controlled, semi-automated, fully automated, etc.).

In some embodiments, mounting hardware attaches the tablet 306 to the materials handling vehicle. In some embodiments, the mounting hardware enables the tablet to be readily attached and removed, e.g., using a ball, quick connect, snap in, slide in, button release or other suitable structure. In some embodiments, such as where the tablet serves as an outward facing display (e.g., pedestrian/information display), the mounting hardware can be configurable or repositionable so as to be able to readily position the tablet 306 for optimal viewing by individuals outside the operator's compartment.

In yet other embodiments, the mounting hardware includes a harness to bring electrical connections to the tablet. Electrical connections can include power, a wired connection to the vehicle electronics (e.g., USB bus connection, etc.), pogo pins, or other suitable connectors.

With reference generally to FIG. 2, FIG. 3A and FIG. 3B, the tablet 206, 306 can be mounted to and/or unmounted from, the materials handling vehicle 108 independent of whether the tablet 206, 306 is communicably coupled to the materials handling vehicle (e.g., to the embedded information core 204). Likewise, the tablet 206, 306 can be communicably coupled to, or communicably uncoupled from the materials handling vehicle (e.g., to/from the embedded information core 204) independent of whether the tablet 206, 306 is mounted to and/or unmounted from, the materials handling vehicle 108. Moreover, regardless of whether mounted or unmounted, the tablet 206, 306 can be communicably coupled to the embedded information core 204 via a wired connection, a wireless connection (and in some embodiments, both wired and wireless connections).

For instance, the tablet 206, 306 can be docked to the materials handling vehicle, e.g., to charge, but may be not paired or otherwise not communicably coupled to the embedded information core 204. As another example, the tablet 206, 306 can run one or more apps, such as an information display, pedestrian warning display, beacon, WMS interface, communication interface, web browser, etc., which are independent of vehicle functionality and thus, no connection is needed to the information core 204.

Likewise, the tablet 206, 306 can be communicably coupled or communicably uncoupled to the materials handling vehicle independent of whether the tablet 206, 306 is mounted to the materials handling vehicle. For instance, as will be described in greater detail herein, the tablet 206, 306 can be communicably coupled to the embedded information core 204 of the materials handling vehicle via a wired or wireless connection. An operator may unmount the tablet 206, 306 (if previously mounted) and use the tablet 206, 306, e.g., wirelessly communicably coupled to the embedded information core 204 in cooperation with the embedded information core 204, e.g., to complete a pre-use inspection checklist, take a picture of a something of interest, scan product information, remotely control a truck feature such as vehicle lockout function, automation function, to provide a remote display of truck information, etc. Here, the tablet 206, 306 maintains communicable coupling to the embedded information system regardless of whether the tablet 206, 306 is docked or not.

As another example, the tablet 206, 306 can display current vehicle operating states, e.g., via a graphical widget or widgets. For instance, widgets can display speed, battery charge, fork height, load weight, time, date, shift, vehicle performance tuning, combinations thereof, etc., where the displayed data is discovered from or otherwise received from the embedded information core 204. Yet further, the tablet 206, 306 can display vehicle data based upon information extracted from controllers on the vehicle such as hour meters, task based progress meters, etc., where such data is obtained or otherwise discovered via communication with the embedded information core 204. Other examples are set out in greater detail herein.

Truck/Tablet Interface Example 1

Figure 4:
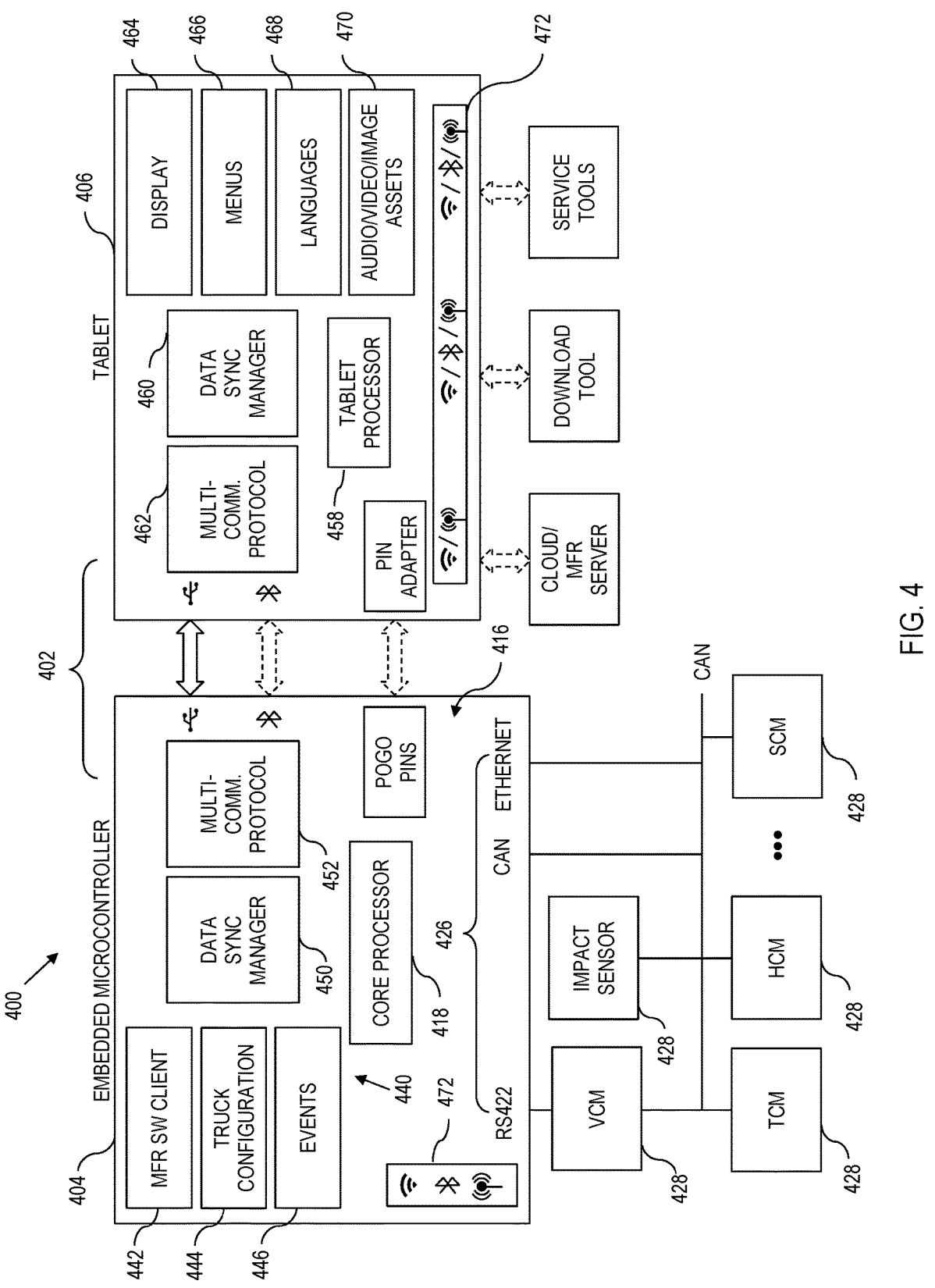
FIG. 4 is a block diagram of a communication and control configuration that interfaces a tablet to a materials handling vehicle.

Referring to FIG. 4, a block diagram illustrates an example truck/tablet interface 400. Like components are illustrated with reference numbers 100 higher than in FIG. 3, 200 higher than FIG. 2, 300 higher than FIG. 1, etc. As such, the discussion of the previous figures is adopted by analogy to FIG. 4 for like/analogous components.

The interface 400 includes components that collectively implement a processing device 402.

According to aspects of the present disclosure, the processing device 402 is implemented as an embedded information core 404 and a tablet 406, which together define a distributed multi-processor vehicle control architecture. In this regard, the processing device 402 can implement the processing device 202 of FIG. 2. As such, like elements are illustrated with like reference numbers 200 higher. Similarly, the processing device 402, analogous to the processing device 202, is an example embodiment of a processing device 102 on the materials handling vehicle 108 in FIG. 1.

As illustrated, the embedded information core 404 includes an information controller 416. The information controller 416 includes a core processor 418 and memory necessary to carry out capabilities described more fully herein.

In a manner analogous to that described with reference to FIG. 2, the embedded information core 404 communicates with vehicle components via a materials handling vehicle network 426. For sake of simplified explanation herein, the materials handling vehicle network 426 is illustrated as including one or more CAN bus (or busses), an RS422 bus, and an ethernet bus that couple the information controller of the embedded information core 404 to electronic modules, e.g., controllers, modules, sensors, encoders, etc., such as a Vehicle Control Module (VCM), a Traction Control Module (TCM), a Hydraulics Control Module (HCM), a Steer Control Module (SCM); impact sensors, etc.

However, in practice, any vehicle network or combination of vehicle networks can be implemented, in any combination.

As illustrated, the memory of the information controller 416 includes memory 440 that stores various components of data utilized by the system. Example data includes client data 442 (e.g., a materials handling vehicle manufacturer's software client (MFR SW Client) data), truck configuration data 444, and event data 446.

The client data 442 stores data that is, for example, unique to the particular instance of the main component (e.g., embedded information core 404), and allows the main component (embedded information core 404) to uniquely identify itself within a fleet.

The truck configuration data 444 stores, for example, information that is specific to the associated materials handling vehicle, including model, serial number, components, software versions, performance tuning parameters, customization parameters, etc.

The event data 446 includes, for example, data that the system collects as the materials handling vehicle is operated. This can include event codes, error codes, and other messages communicated across the vehicle network 426, data collected by the processor 418 as the materials handling vehicle is operated, etc. For instance, the event data 446 can log encounters with geo-features, operator login information, checklist compliance information, and other information generated as a function of use.

A data synchronization manager 450 can be implemented, for instance, by a process performed by the processor 418 of the information controller 416, and is responsible for synchronizing the exchange of information between the materials handling vehicle and external devices, e.g., the tablet 406, remote server, wireless remote device(s), etc.

A multi-communication protocol module 452 is a process carried out by the processor 418 of the information controller 416 and is responsible to manage physical communication ports of the main module, including for example, USB, Bluetooth, ultra- wideband, cellular, video ports, input/output ports (I/O), combinations thereof, etc., such as by implementing a communication protocol.

The tablet 406 forms an interface to the embedded information core 404, and to the operator of the materials handling vehicle. In this regard, the tablet 406 includes a tablet processor 458 coupled to memory, a data synchronization manager 460 that works with the data synchronization manager 450 of the embedded information core 404.

The tablet 406 also includes a multi-communication protocol module 462 that is configured to interact with the multi-communication protocol module 452 of the embedded information core 404. For instance, the illustrated tablet 406 couples to the embedded information core 404 via any combination of USB, Bluetooth, or pogo pins and a corresponding pin adapter, etc.

The tablet 406 also includes other functional components, including for example, program code that handles the display at 464, program code that handles menus at 466, program code that handles language preferences at 468, audio/video/image asset management at 470, or combinations thereof.

The tablet 406 also includes one or more transceiver(s) 472 and corresponding stacks, hardware, and software. For instance, the illustrated tablet 406 includes a Wi-Fi transceiver and a Bluetooth transceiver. The tablet 406 may also include a cellular transceiver, an ultra-wide band transceiver, an RF transceiver (e.g., for communicating with RFID devices or NFC (near-field communication) devices), etc. In practical applications, any one or more transceivers may be provided in any combination. However, for sake of example, the Wi-Fi transceiver is capable of wirelessly communicating with remote servers, e.g., over Wi-Fi, and the Internet, a Wi-Fi to cellular gateway, etc. For instance, the Wi-Fi transceiver can communicate with the remote server 112 (FIG. 1). The transceivers 472 may also include a Bluetooth transceiver that is capable of pairing with nearby Bluetooth devices. The tablet 406 may also include a cellular transceiver. The cellular transceiver can communicate with one or more cellular networks, (e.g., via communication with 5G networks, routers, etc.,), a cellular to Wi-Fi gateway, etc. The Bluetooth transceiver, Wi-Fi transceiver, cellular transceiver, combinations thereof (or any other suitable transceiver technologies or combinations thereof) can be used for interacting with download tools, services tools, or other devices and/or systems to provide inputs to the tablet 406.

The transceiver(s) are used to enable the tablet 406 to communicate with applications external to the associated materials handling vehicle, e.g., to enable the tablet 406 to communicate with a cloud storage system/manufacturer server (e.g., to store collected truck data and carry out manufacturer/truck specific interactions. The tablet 406 can also interact with a download tool, e.g., provided by the manufacturer of the materials handling vehicle, such as for downloading software updates, firmware updates, for receiving updated parameters, programming, etc. As yet another example, the tablet 406 can interact with service tools, e.g., to log service requirements, transmit error or fault codes, to facilitate service/maintenance checklists, etc.

In some embodiments, the embedded information core 404 may also include one or more transceiver(s) 472 and corresponding stacks, hardware, and software. For instance, the embedded information core 404 may include a Wi-Fi transceiver, a Bluetooth transceiver, a cellular transceiver, an ultra-wide band transceiver, an RF transceiver (e.g., for communicating with RFID devices or NFC devices), etc. In practical applications, any one or more transceivers may be provided in any combination, as described more fully herein.

Notably, in the illustrated example interface, the information controller 416 includes a core processor 418 that is independent of the tablet processor 458. Likewise, the information controller 416 includes memory that is independent of the tablet memory. As such, the information controller 416 can function as an information manager. However, the tablet processor 458 can share information stored in tablet memory with the core processor 418, and the core processor 418 can share information stored in the embedded information core, e.g., the memory 440, with the tablet processor 458. The exchange can occur via a push, pull, query, or other interaction.

Truck/Tablet Interface Example 2

Figure 5:
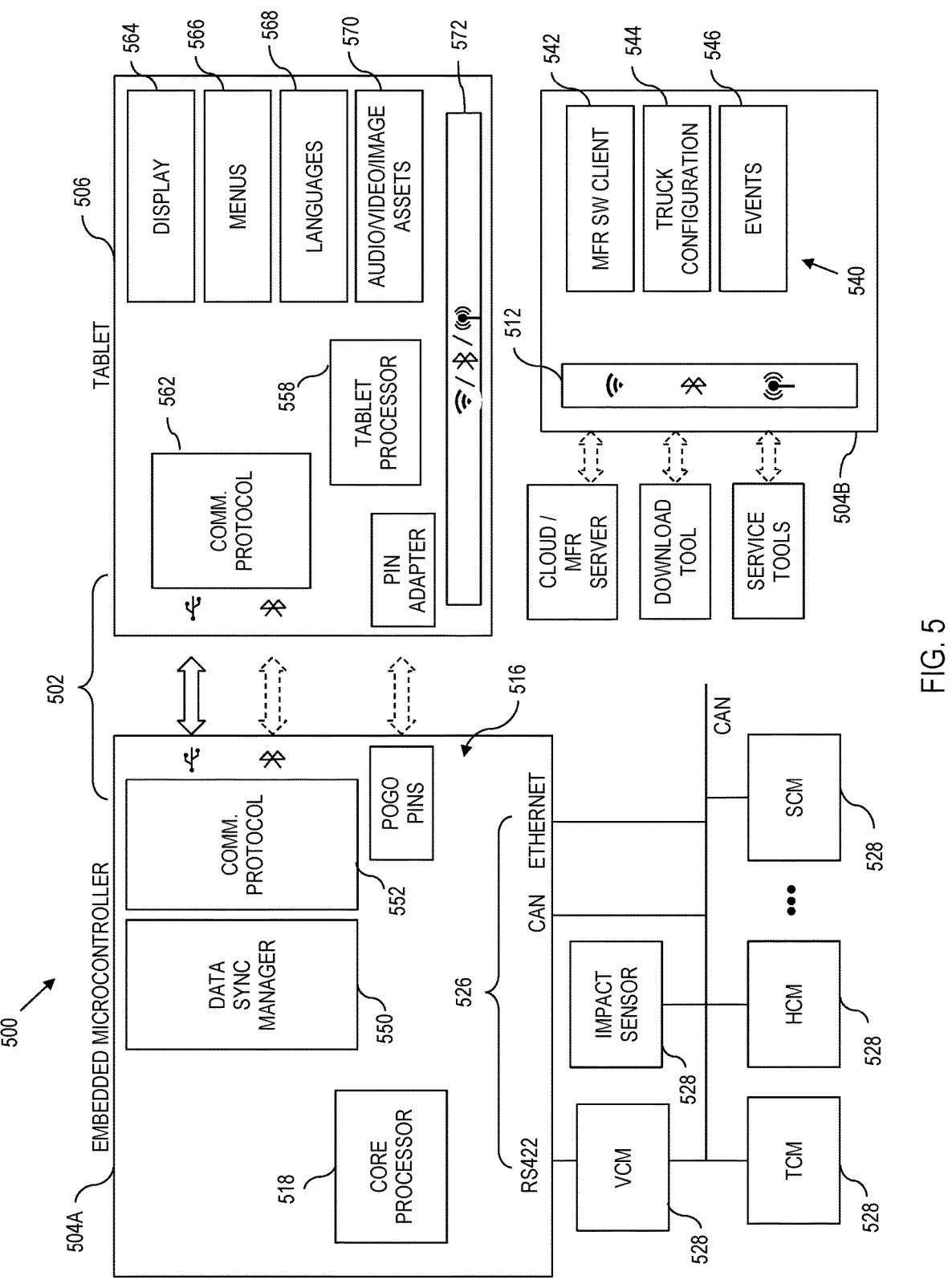
FIG. 5 is a block diagram of another communication and control configuration that interfaces a tablet to a materials handling vehicle.

Referring to FIG. 5, a block diagram illustrates an example truck/tablet interface 500. Like components are illustrated with reference numbers 100 higher than in FIG. 4, 200 higher than FIG. 3, 300 higher than FIG. 2, etc. As such, the discussion of the previous figures is adopted by analogy to FIG. 5 for like/analogous components. As illustrated, the interface 500 includes components that collectively define a processing device 502.

In this regard, the processing device 502 is analogous to the processing device 202 and is thus an example embodiment of a processing device 102 on the materials handling vehicle 108 in FIG. 1.

According to aspects of the present disclosure, the processing device 502 is implemented as an embedded information core 504 and a tablet 506, which couple together to create a distributed multi-processor vehicle control architecture. In this regard, the processing device 502 can implement the processing device 202 of FIG. 2. As such, like elements are illustrated with like reference numbers 300 higher. Moreover, many functions and features of FIG. 5 are present in the interface 400 of FIG. 4. As such, like references are illustrated with like reference numbers 100 higher. Where like function is implemented to aspects described with reference to FIG. 4, the disclosure applies by analogy, such that only differences will be described in detail with regard to FIG. 5.

As illustrated, unlike FIG. 4, the embedded information core 504 is logically implemented as two components, including an interface component 504A and a management component 504B. Logically, the interface component 504A and the management component 504B make up the features of the embedded information core 404 (FIG. 4). However, the management component 504B includes an additional transceiver 512 for wireless communication, e.g., via Wi-Fi, Bluetooth, ultra-wideband, a combination thereof, etc.

As illustrated, the embedded information core 504 includes an information controller 516. The information controller 516 includes processing and memory necessary to carry out the capabilities described more fully herein. For instance, the information controller 516 includes a core processor 518 and memory 540 that stores various components of data utilized by the system. Example data includes client data 542 (e.g., a materials handling vehicle manufacturer's software client (MFR SW Client) data), truck configuration data 544, and event data 546.

A data synchronization manager 550 can be implemented, for instance, by a process performed by the processor 518 of the embedded information core 504 (e.g., the interface component 504A and/or the management component 504B), and is responsible for synchronizing the exchange of information between the materials handling vehicle and external devices, e.g., the tablet 506, remote server, wireless remote device(s), etc.

A multi-communication protocol module 552 is carried out by the embedded information core 504 (e.g., the interface component 504A and/or the management component 504B), and is responsible for managing physical communication ports of the main module, including for example, USB, Bluetooth, ultra-wideband, cellular/5G, video ports, input/output ports (I/O), etc. In a manner that is analogous to that described with reference to FIG. 2, the embedded information core 504 (e.g., the interface component 504A and/or the management component 504B) communicates with vehicle components via a materials handling vehicle network 526. For sake of simplified explanation herein, the materials handling vehicle network 526 is illustrated as including one or more CAN bus (or busses), an RS422 bus, and an ethernet bus that couple the embedded information core 504 to several controllers, modules, and devices, such as a Vehicle Control Module (VCM), a Traction Control Module (TCM), a Hydraulics Control Module (HCM), a steer control module (SCM); impact sensors, etc.

However, in practice, any vehicle network or combination of vehicle networks can be implemented, in any combination.

The tablet 506 forms an interface to the embedded information core 504 (e.g., the interface component 504A and/or the management component 504B), and to the operator of the materials handling vehicle. In this regard, the tablet 506 includes a tablet processor 558 coupled to memory. The tablet 506 also includes a data synchronization manager 560 that works with the data synchronization manager 550 of the main module.

The tablet 506 also includes a multi-communication protocol module 562 that is configured to interact with the multi-communication protocol module 552 of the embedded information core 504 (e.g., the interface component 504A and/or the management component 504B). For instance, the illustrated tablet 506 couples to the main component 504 via any combination of USB, Bluetooth, or pogo pins and a corresponding pin adapter, etc.

The tablet 506 also includes other functional components, including program code that handles the display at 564, program code that handles menus at 566, program code that handles language preferences at 568, and audio/video/image asset management at 570.

The embedded information core 504 (e.g., the interface component 504A and/or the management component 504B as illustrated) and/or the tablet 506 can include one or more transceiver(s) 512, 572 and corresponding stacks, hardware, and software. For instance, the illustrated management component 504B and tablet 506 each include a Wi-Fi transceiver and a Bluetooth transceiver. The management component 504B and tablet 506 may also include a cellular transceiver, an ultra-wide band transceiver, an RF transceiver (e.g., for communicating with RFID devices or NFC devices), etc. In practical applications, any one or more transceivers may be provided in any combination. However, for sake of example, the Wi-Fi transceiver is capable of wirelessly communicating with remote servers, e.g., over Wi-Fi, and the Internet, a Wi-Fi to cellular gateway, etc. For instance, the Wi-Fi transceiver can communicate with the remote server 112 (FIG. 1). The transceivers 572 may also include a Bluetooth transceiver that is capable of pairing with nearby Bluetooth devices. The tablet 506 may also include a cellular transceiver. The cellular transceiver can communicate with one or more cellular networks (e.g., via communication with 5G networks, routers, etc.,) a cellular to Wi-Fi gateway, etc. The Bluetooth transceiver, Wi-Fi transceiver, cellular transceiver, combinations thereof (or any other suitable transceiver technologies or combinations thereof) can be used for interacting with download tools, services tools, or other devices and/or systems to provide inputs to the management component 504B and/or the tablet 506.

In practical applications, the management component 504B and tablet 506 need not include the same transceiver types. Moreover, in some embodiments, the interface component 504A may include one or more transceivers, e.g., in addition to or in lieu of the transceivers in the management component 504B.

Likewise, the interface component 504A of the embedded information core 504 can also include one or more transceiver(s) and corresponding stacks, hardware, and software, analogous to that described above.

As illustrated, in FIG. 5, the management component 504B can be capable of wirelessly communicating with remote servers, e.g., over Wi-Fi, and the Internet, a cellular to Wi-Fi gateway, etc. For instance, the Wi-Fi transceiver can communicate with the remote server 112 (FIG. 1). The transceivers can be used for interacting with cloud/manufacturer databases, download tools, services tools, or other devices and/or systems analogous to that described more fully herein. Communication with the manufacturer cloud, download tools, service tools, etc., can provide inputs to the embedded information core 504 (e.g., the interface component 504A and/or the management component 504B).

Analogous to the embodiment of FIG. 4, the information controller 516 includes a core processor 518 that is independent of the tablet processor 558. Likewise, the information controller 516 includes memory that is independent of the tablet memory. However, the tablet processor 558 can share information stored in tablet memory with the core processor 518, and the core processor 518 can share information stored in the embedded memory 540 with the tablet processor 558. The exchange can occur via a push, pull, query, or other interaction.

Distributed Processor System

Referring generally to FIG. 1 through FIG. 5, a materials handling vehicle communication system is provided, which includes a distributed multi-processor vehicle control architecture, according to aspects of the present disclosure.

According to aspects of the present disclosure, a materials handling vehicle (e.g., 108, FIG. 1) includes a materials handling vehicle communication system. More particularly, the materials handling vehicle communication system comprises a vehicle network (e.g., 226, FIG. 2; 426, FIG. 4; 526, FIG. 5) that facilitates an exchange of information with vehicle electronic components. The materials handling vehicle communication system also comprises an embedded information core and a tablet.

The embedded information core (e.g., embedded information core 204, FIG. 2; embedded information core 404, FIG. 4; embedded information core 504 implemented as an interface component 504A and a management component 504B, FIG. 5) includes a core processor communicably coupled to the vehicle network.

The tablet (e.g., tablet 206, FIG. 2; tablet 406, FIG. 4; tablet 506, FIG. 5) has a tablet processor. Moreover, in some embodiments, the tablet is programmably configured to communicably couple to, and decouple from, the embedded information core. Additionally, in some embodiments, the tablet is mountable to, and un-mountable from, the materials handling vehicle, independent of communicable coupling to the embedded information core. Moreover, in some embodiments, the communicable coupling can be via a wired connection, a wireless connection, or both.

When the tablet is communicably coupled to the embedded information core, the tablet processor functions in cooperation with the core processor (e.g., the tablet processor may function as an auxiliary processor to the core processor), defining a distributed multi-processor vehicle control architecture where the core processor and the tablet processor cooperate to exchange at least one vehicle parameter between the tablet and an associated one of the vehicle electronic components.

In some embodiments, when the tablet is detached from the distributed multi-processor vehicle control architecture, the core processor of the information controller functions as a main processor (e.g., at least for vehicle functionality) that communicates with and controls at least one vehicle electronic component by communicating therewith across the vehicle network. For instance, as best illustrated in FIG. 2, FIG. 4 and FIG. 5, the information controller is directly connected to the vehicle network and includes its own processor and memory. As such, the core processor is capable of acting autonomously and independent of the presence of the tablet. That is, in some embodiments, the tablet is not necessary for normal operation of the materials handling vehicle because the core processor can handle all of the necessary vehicle functions.

Moreover, the embedded controller can communicate with the tablet to exchange information therewith. In this regard, the core processor can have a range of tasks that remain fixed regardless of whether the tablet is communicably coupled thereto. As another example, the core processor can expand processing responsibility when a tablet is not communicably coupled.

In some embodiments, when the tablet is communicably coupled to the information controller, the tablet processor functions as a primary processor, and the core processor functions as a subordinate processor, such that the subordinate processor receives commands from the primary processor, and conveys those commands directly to the vehicle network to control at least one vehicle electronic component. The subordinate processor can likewise pass information to the primary processor for processing, display, and manipulation thereof.

In some embodiments, when the tablet is communicably coupled to the information controller, the tablet processor functions as a subordinate processor, and the core processor functions as a primary processor, such that the subordinate processor receives commands from the primary processor, and conveys those commands directly or indirectly to the vehicle network to control at least one vehicle electronic component. The subordinate processor can likewise pass information to the primary processor for processing, display, and manipulation thereof.

In yet other embodiments, a distributed multi-processor vehicle control architecture is configured such that a set of tasks are allocated to the core processor, and a set of tasks are allocated to the tablet processor. As such, the core processor continues to carry out the assigned tasks regardless of whether the tablet is communicably coupled or not. In some embodiments, the tasks are dynamically adjusted based upon a state of the tablet. For instance, when a tablet is mounted to the materials handling vehicle, and the tablet is communicably coupled to the embedded information core, the tablet can function as a dashboard, e.g., to display widgets that show a current operating state of the vehicle, e.g., travel speed, travel direction, fork height, load weight, etc. When the tablet is unmounted (but still communicably coupled), the task of the tablet can automatically change to a checklist, etc. The above examples are not exhaustive.

As an example, as illustrated in FIG. 4, the tablet 406 can receive configuration information from a remote server across a network connection, e.g., a Wi-Fi connection. More specifically, as best illustrated in the example embodiment of FIG. 4, the tablet comprises a transceiver for wireless communication, e.g., with a remote server (such as the remote server 112 coupled to the materials handling vehicle information data source 118, FIG. 1). The tablet receives information from the remote server corresponding to an instruction to modify the operation of the materials handling vehicle. The tablet processor, responsive to receiving the information from the remote server, communicates the information to the core processor. For instance, the tablet 406 then communicates, via the multi-communication protocol module 462 to the multi-communication protocol module 452 of the embedded controller. In this example, the tablet processor communicates with the core processor via at least one of Bluetooth and Universal Serial Bus. In this regard, the system herein can perform an over-the-air update, etc. Yet further, updates can be implemented via a local connection, e.g., USB, flash drive, PC, PC USB to CAN download, etc.

The processor of the embedded information core correspondingly includes program code that is read out and processed by the core processor to cause the core processor to communicate the received configuration data received from the tablet 406, to the appropriate vehicle component, e.g., by communicating an updated set point, configuration, setting, parameter, etc., across the vehicle network 426. For instance, as noted more fully herein, the embedded information core includes a data synchronization manager that manages synchronizing data collected from the materials handling vehicle with information exchanges with the tablet. The core processor can use the data synchronization manager to facilitate the modification to the operation of the materials handling vehicle. For instance, the core processor effects the modification by communicating across the vehicle network to modify operation of the materials handling vehicle.

In some embodiments, the tablet can pass configuration information and other commands, e.g., to modify set points, to request data for logging, to configure vehicle performance, to update software, etc., to the core processor via the multi-communication protocol module such that the core processor ultimately carries out the commands from the tablet. Moreover, the tablet can display widgets and other materials handling vehicle information, where the necessary information is extracted from vehicle components across the vehicle network by the core processor. The core processor processes the collected information, and passes the information to the tablet for display, e.g., in a graphical interface display, such as through the use of widgets.

In an alternative example, e.g., with reference to FIG. 5, the embedded information core can comprise a transceiver for wireless communication with a remote server (e.g., see management component 504B, which can communicate via a wireless technology such as Wi-Fi with a remote server such as server 112, FIG. 1). The embedded information core receives information from the remote server corresponding to an instruction to modify the operation of the materials handling vehicle, and the core processor effects the modification by communicating across the vehicle network to modify operation of the materials handling vehicle.

Here, the core processor communicates a message to the tablet processor to modify the tablet display (e.g., to modify displayed content on the tablet display, e.g., to modify a content item such as an icon, widget, value, symbol or any other displayable information displayed on the tablet) based upon the modification to the materials handling vehicle. For example, data regarding the update can be stored by the data synchronization manager 550. The communication protocol module 552 handles the communication with the communication protocol module 562 of the tablet. The tablet processor can then extract the information and use that information to update the relevant widget, e.g., a speed widget, lift widget, task widget, timer widget, etc. For instance, if the modification is to set a top speed, a message can be provided designating as such and/or a speed widget can be modified to reflect the maximum speed, etc.

With reference to the FIGURES generally, in some embodiments, the tablet can act as a control, intermediate, display, or combination thereof, for interacting with the embedded information core, or for other device(s), control modules, peripherals, etc., associated with the materials handling vehicle. For instance, the tablet can pair with, connect to, or otherwise communicate directly with a battery monitor, impact sensor, or other device on the materials handling vehicle that can communicate with the tablet.

In some embodiments, the tablet runs a "control application" that controls what applications can be installed on the tablet. This allows a manufacturer to review and approve apps for loading on the tablet, while fully enabling the flexibility and capability of the tablet. For instance, third-party apps approved by a source (e.g., the manufacturer) can still load and run on the tablet.

Distributed Location Information

A tablet can include a global positioning system. However, a materials handling vehicle is likely to use a different position tracking system to address the issue of indoor operation. However, in certain embodiments, GPS (Global Positioning System) from the tablet can be used, modified, enhanced, reconciled, or otherwise comingled with the material handling vehicle location tracking system. This enables different types of position/location information to be leveraged for different applications.

Example Information Exchange

Referring to FIG. 6, a process 600 for modifying operation of a materials handling vehicle is provided. The process 600 comprises receiving at 602, an electrical signal representing an instruction to modify an operating condition of the materials handling vehicle. Here, the instruction may be received, for example, from a tablet that is removably mounted to the materials handling vehicle. Moreover, the instruction is formatted in an open standard communication protocol. The process 600 also comprises converting at 604, the instruction received in the open standard communication protocol to a modification command to modify an associated electrical component of the materials handling vehicle according to parameter extracted from the instruction. The process 600 still further comprises transmitting at 606, the modification command to the electrical component of the materials handling vehicle via a vehicle network of the materials handling vehicle. The electrical component receives the modification command and transforms an operating state of the electrical component so as to cause an overall modification of the operation of the materials handling vehicle.

As noted more fully herein, in some embodiments, the tablet is configured to communicably couple to and communicably decouple from, the materials handling vehicle. Also, in some embodiments, the tablet is mountable to the materials handling vehicle independent of communicable coupling to materials handling vehicle.

In some embodiments, receiving at 602, an electrical signal representing an instruction to modify an operating condition of the materials handling vehicle includes receiving the electrical signal by a processor integrated into the materials handling vehicle, the processor communicably coupled to the materials handling vehicle network for communication with electronic modules on the materials handling vehicle.

Also, in some embodiments, receiving at 602, an electrical signal representing an instruction to modify an operating condition of the materials handling vehicle, wherein the instruction is received from a tablet that is removably mounted to the materials handling vehicle comprises receiving the electrical signal from the tablet while the tablet is undocked from the materials handling vehicle and is connected to the materials handling vehicle by a wireless connection.

Yet further, in some embodiments, receiving at 602, an electrical signal representing an instruction to modify an operating condition of the materials handling vehicle can further comprise receiving the instruction generated by an application executing on the tablet responsive to a user interacting with a graphical user interface on a touchscreen of the tablet.

In some embodiments, converting at 604, the instruction received in the open standard communication protocol to a modification command to modify an associated electrical component of the materials handling vehicle according to a parameter extracted from the instruction can comprise formatting the instruction in the open standard communication protocol as a packet having a header and payload where the payload contains the modification command, and the packet is wrapped with an encryption.

Yet further, in some embodiments, the process 600 can further comprise determining if the tablet is communicably coupled to the materials handling vehicle, determining whether the tablet can handle a processing task associated with the materials handling vehicle, sending data associated with the processing task from the materials handling vehicle to the tablet, receiving, from the tablet, a modification parameter based upon the tablet executing an application, and modifying the materials handling vehicle according to the modification parameter received from the tablet.

Also, in some embodiments, the process 600 can further comprise determining whether the removable tablet is communicably coupled to the materials handling vehicle via a wired open standard communication protocol, a wireless open standard communication protocol, or both a wired open standard communication protocol and a wireless open standard communication protocol, and prioritizing the wired open standard communication protocol over the wireless open standard communication protocol where both the wired open standard communication protocol and wireless open standard communication protocol are utilized and the wired open standard communication protocol is detected as being active. In some implementations, determining whether the removable tablet is communicably coupled to the materials handling vehicle via a wired open standard communication protocol can comprise detecting the presence of a hardwired universal serial bus (USB) connection, and detecting that the USB connection is active by detecting an acknowledgement signal from the removable tablet over the USB connection. Also, the process 600 can further comprise prioritizing the wireless open standard communication protocol over the wired open standard communication protocol where the wired open standard communication protocol is detected as being inactive.

In some embodiments, the process 600 may further comprise completing a communication sequence between the removable tablet and the materials handling vehicle by using the wired open standard communication protocol to initiate the communication sequence, detecting that the wired open standard communication protocol has become inactive, and switching over to the wireless open standard communication protocol without interruption in the communication sequence.

In yet some embodiments, the process 600 may further comprise completing a communication sequence between the removable tablet and the materials handling vehicle by using the wireless open standard communication protocol to initiate the communication sequence, detecting that the wireless open standard communication protocol has become inactive, and switching over to the wired open standard communication protocol without interruption in the communication sequence.

With reference to FIG. 1-FIG. 6, in an example embodiment, the electrical signal representing an instruction to modify an operating condition of the materials handling vehicle is received by a processor integrated into the materials handling vehicle (e.g., the processor in the information controller 218 of the information core 204, FIG. 2; the core processor in the information controller 416, FIG. 4; the core processor in the information controller 516, e.g., via the interface component 504A and/or the management component 504B of the embedded information core, FIG. 5, etc.). Regardless of configuration, the processor is communicably coupled to the materials handling vehicle network for communication with electronic modules on the materials handling vehicle (see for example, vehicle network 226, FIG. 2, vehicle network 426, FIG. 4, vehicle network 526, FIG. 5, etc.). Thus, a network connection facilitates the ability to communicate the modification command.

As noted more fully herein, some embodiments distinguish when a tablet is communicably coupled (e.g., connected/paired) with the embedded controller. This allows, for example, the tablet processor to serve in a supervisory role when connected/paired, whereas the core processor functions in a subordinate role. Alternatively, the tablet processor can function in an auxiliary role to the core role of the core processor. This also allows the tablet to become communicably uncoupled (e.g., unpaired) from the embedded information controller, thus freeing the tablet to perform other functions without affecting the operation of the materials handling vehicle. Regardless of electrical connection status, the tablet can be docked to the materials handling vehicle and/or detached by a physical connection.

Pairing/interfacing the tablet processor to the core processor is discussed in greater detail herein. However, by way of introduction, aspects herein enable the tablet to function in modes including:

Paired and Docked

In a paired and docked configuration, the tablet is physically mounted on the materials handling vehicle, electrically connected to the materials handling vehicle, and paired with the core processor.

Unpaired and Docked

In an unpaired and docked configuration, the tablet is physically mounted on the materials handling vehicle, and may be electrically connected such as to receive power/charge. However, the tablet is not in communication with the embedded core processor.

Thus, the tablet may be electrically disconnected from the materials handling vehicle, and not paired with the core processor.

Paired and Undocked

In a paired and undocked configuration, the tablet is communicably coupled to the core processor of the materials handling vehicle and is capable of communicating with the core processor via wired or wireless connection. However, the tablet is not physically mounted on the materials handling vehicle.

Unpaired and Undocked

In an unpaired and undocked configuration, the tablet is not communicably coupled to the core processor of the materials handling vehicle, and is thus incapable of communicating with the core processor via wired or wireless connection. Moreover, the tablet is not physically mounted on the materials handling vehicle. However, the tablet may still be usable, e.g., by an operator to display information from a warehouse management system, to function in an operational manner to facilitate communication, e.g., via messaging, to capture photos or video of operational environmental conditions, etc.

As a few example embodiments, the tablet can include software specific to materials handling vehicles, e.g., to a type, model, class, etc., of materials handling vehicle. In this regard, the tablet can implement a graphical user interface that displays on a touchscreen of the tablet, one or more widgets, meters, gauges, operator scores, warnings, instructions, messages, dashboard information, etc., based upon interacting with the materials handling vehicle, a remote server, or combination thereof. Thus, by way of example, assume that a materials handling vehicle has a load handling feature such as forks that can raise and lower. Here, the graphical user interface of the tablet can display a widget or program such as a rack height select widget. The vehicle operator can interact with the rack height select widget, e.g., by touching the touch screen, to select a height to raise the forks. In this example, the core processor on the materials handling vehicle receives an instruction generated by an application (e.g., rack height select widget) executing on the tablet responsive to the vehicle operator interacting with a graphical user interface on the touchscreen of the removable tablet.

Notably, in this example, the application may be programmed to selectively enable or disable the operator interaction. For instance, in some applications, it may be okay to enable use of the rack height select control, even if the removable tablet is undocked. For instance, a vehicle operator may dismount the materials handling vehicle to check a vantage point, rack location, etc. Thus, in this example, so long as the removable tablet is paired (communicably coupled), it does not matter if the removable tablet is docked or undocked. In other examples, it may be desirable to require that the tablet is both docked, e.g., and thus inside an operator's compartment of the materials handling vehicle, and paired with the core processor.

The removable tablet thus virtualizes the function of the rack height select so that the vehicle operator is not constrained to be in a single physical position, as would be required for the operator to use a hardwired/integrated interface. That is, the tablet includes a software application, e.g., implemented as a widget, that mimics a hardware control that is physically present on the materials handling vehicle. Thus, an electrical signal is received from the tablet responsive to the tablet executing a software application that virtualizes a control of a materials handling vehicle feature, and the modification command transforms the virtualized control into a corresponding physical control of the materials handling vehicle. Other examples can include using the removable tablet to virtualize a blend control, a speed control, a load weight control, a timer or other workflow/job function widget, a widget for controlling a horn or controlling lights of the materials handling vehicle, etc.

Thus, receiving an electrical signal representing an instruction to modify an operating condition of the materials handling vehicle can comprise receiving the instruction generated by an application executing on the tablet responsive to a user interacting with a graphical user interface on a touchscreen of the tablet.

In practical applications, the instruction communicated to the core processor can be generated by an application executing on the tablet internally, e.g., via computation, user input, etc., or the instruction can be generated responsive to the tablet wirelessly communicating with a remote device, e.g., another close-by materials handling vehicle, a remote server, a remote electronic badge or marker, a smartphone, other tablet, laptop computer, etc.

As another example, the operator may be required to complete a pre-use inspection checklist. Normally, this requires the operator to be at the point of the display. However, in the present disclosure, since the communication connection is independent of the physical connection, the operator can detach the tablet from the materials handling vehicle and walk around the vehicle with the tablet in hand, completing the checklist at the point of inspection.

Moreover, because the tablet can virtualize outputs (e.g., widgets, gauges, camera feeds, dashboard icons, checklist displays, etc.) and the tablet can optionally virtualize vehicle controls (e.g., one or more inputs such as steer wheel, acceleration, braking, blending, hydraulics, forks, load handling, combinations thereof), checklists, maintenance checklists, and pick operations, and other features can be performed outside the normal operator's compartment position. In this regard, virtualizations can mimic or alter the physical counterpart of the vehicle. For instance, some virtualizations may provide reduced functionality, performance tuned or detuned capability or other modifications as desired by the vehicle manufacturer.

Open Standard Communication

As noted above, in this example embodiment, the instruction is formatted in an open standard communication protocol. As a few illustrative examples, the open standard can include Bluetooth, USB, ethernet, ultra-wideband, cellular, other open standard, or a combination thereof. Typically, an open standard will have a published or open specification, various rights granted to users, or a combination thereof. By way of example, referring to FIG. 4 and FIG. 5, the tablet is coupled to the embedded information core via USB, Bluetooth, both (or other connection method). Here, the tablet processor formats the instruction in the open standard communication protocol as a packet having a header and payload where the payload contains the modification command.

In some embodiments, the instruction may be received by reconciling messages using at least two independent and different open standard communication protocols, e.g., Bluetooth and USB. By reconciling both a wired and wireless connection, the embedded controller has an increased assurance of receiving a proper message.

Alternatively, a protocol can be prioritized. For instance, a process may be responsible for prioritizing the wireless open standard communication protocol over the wired open standard communication protocol where the wired open standard communication protocol is detected as being inactive and/or prioritizing the wired open standard communication protocol over the wireless open standard communication protocol where the wireless open standard communication protocol is detected as being inactive.

FIG. 7 illustrates a process 700 for modifying operation of a materials handling vehicle, where instructions are communicated across an open standard communication protocol. At 702, the process for modifying operation of a materials handling vehicle can comprise receiving by a processor on a materials handling vehicle, from a tablet that is communicably coupled to the materials handling vehicle, an instruction to modify an operating condition of an electrical component of the materials handling vehicle. In this example, the instruction is communicated across an open standard communication protocol. The process also comprises, at 704, determining whether the removable tablet is communicably coupled to the materials handling vehicle via a wired open standard communication protocol, a wireless open standard communication protocol, or both a wired open standard communication protocol and a wireless open standard communication protocol.

At 706, the process yet further comprises prioritizing the wired open standard communication protocol over the wireless open standard communication protocol where the wired open standard communication protocol is detected as being active. At 708, the process comprises converting by a processor on the materials handling vehicle, the instruction to a modification command to modify an associated electrical component of the materials handling vehicle according to a parameter extracted from the instruction. At 710, the process comprises transmitting the modification command to the electrical component of the materials handling vehicle via a vehicle network of the materials handling vehicle, wherein the electrical component receives the modification command and transforms an operating state of the electrical component so as to cause an overall modification of the operation of the materials handling vehicle.

The process can determine whether the removable tablet is communicably coupled to the materials handling vehicle via a wired open standard communication protocol by detecting the presence of a wired connection, e.g., a wired USB connection. The USB connection can be determined to be active by detecting an acknowledgement signal from the tablet over the USB connection. Analogously, the process can determine whether the removable tablet is communicably coupled to the materials handling vehicle via a wireless open standard communication protocol by detecting the presence of a Bluetooth connection, e.g., via detection of a pairing request, identifying a broadcast name, etc.

The exchange can flow in both directions. As noted in greater detail herein, the core processor is communicably coupled to truck data (e.g., truck configuration data 444, 544) that is stored in memory on the materials handling vehicle. Here, the core processor can extract the truck data from the memory on the materials handling vehicle, format the extracted truck data into vehicle information in the open standard communication protocol, and communicate the information to the tablet, e.g., for presentation on a widget graphically output to the touch display of the tablet. The core processor can use the communication protocol to communicate with the tablet across one or more protocols, including open standard protocols, such as USB, Bluetooth, etc.

This bi-directional communication allows the tablet to send information, such as commands to the materials handling vehicle. Bi-directional communication also allows the materials handling vehicle to send information to the tablet. Here, the tablet can process and display the information, process the information and send the processed information back to the materials handling vehicle, or use the tablet transceiver to send the materials handling vehicle information to a remote destination, e.g., the remote server 112. For instance, the core processor of the materials handling vehicle can send information to the tablet, e.g., to store a current state of the vehicle operational parameters, so that the tablet can communicate at least one vehicle operational parameter to a remote device regardless of whether the materials handling vehicle is powered or whether the materials handling vehicle is powered down.

As another example, the core processor can carry out software code to read a current state of vehicle operational parameters and to store the current state of the vehicle operational parameters in the embedded memory. In this instance, the tablet is configured to not store vehicle operational parameters unless specifically instructed by the materials handling vehicle processor to do so.

Thus, for example, the core processor can determine if the removable tablet is communicably coupled to the materials handling vehicle, and optionally, determine whether the removable tablet can handle a processing task associated with the materials handling vehicle. The core processor then sends the data associated with the processing task from the materials handling vehicle to the tablet, receives from the tablet, a modification parameter based upon the tablet executing the application, and modifies the materials handling vehicle according to the modification parameter received from the tablet.

In yet further embodiments, the exchange of information between the materials handling vehicle and the tablet can switch between open protocols. For instance, a communication sequence between the tablet and the materials handling vehicle may be carried out using a wireless open standard communication protocol (e.g., Bluetooth) to initiate the communication sequence. If the components detect that the wireless open standard communication protocol has become inactive, the communication sequence will switch over to the wired open standard communication protocol (e.g., USB) without interruption in the communication sequence. Analogously, the communication sequence can initiate with the wired open standard communication protocol (e.g., USB). If the USB connection has become inactive, the communication sequence can switch over to a wireless open standard communication protocol (e.g., Bluetooth) without interruption in the communication sequence.

Android

In example embodiments, the tablet runs an Android operating system. The Android operating system can execute widgets and other applications that are materials handling vehicle specific. The materials handling vehicle can also use the tablet camera, video, ports and other capabilities that are built in to provide technology capabilities to the materials handling vehicle. In some embodiments, the Android operating system is locked down to prevent the loading of third-party apps to the tablet. In other embodiments, the tablet allows third-party apps, e.g., a garage door opener app, a calculator app, a warehouse management interface app, a remote light switch control app, etc.

In some embodiments, the tablet processor obtains information about a current state of the materials handling vehicle, e.g., time location, operator identification, etc. The obtained information can be derived from the tablet itself, by the tablet interacting with a remote server, or the tablet communicating with the core processor of the information controller. This allows dashboard widgets to be either fixed, or dynamic, e.g., based upon the obtained state information. As an example, the widgets can be modular and adaptive to dynamically change in view of vehicle location data, truck telematic data, operator location data, etc.

Yet further, a proprietary app store can be used to deliver new apps and updated apps to the tablet. This can allow the integration of facial or other biometric integration, new apps, and other capabilities. Yet further, the Android operating system supports a conventional web browser. As such, the vehicle operator may have selective access to the internet, e.g., to stream music, upload photos of job tasks, check the weather, log into fleet management software, etc.

Security

According to further aspects of the present disclosure and referencing FIG. 8, a process 800 for securing access to a materials handling vehicle is provided. The process comprises, at 802, coupling a tablet to a materials handling vehicle via a wired open standard communications protocol.

The process also comprises receiving at 804 a first device identification of the tablet coupled via the wired open standard communications protocol.

The process further comprises storing at 806 the first device identification in memory.

The process also comprises receiving 808 a second device identification via the wireless open standard communications protocol.

Moreover, the process optionally comprises determining at 810 whether another device is already coupled to the materials handling vehicle via the wireless open standard communications protocol.

The process still further comprises communicably coupling at 812 the tablet to the materials handling vehicle via the wireless open standard communications protocol if another device is not already coupled to the materials handling vehicle via the second communications protocol and the second device identification matches the first device identification.

In some embodiments, the process can further comprise providing on the materials handling vehicle, a processor coupled to memory, the processor implementing software code to read a current state of vehicle operational parameters and to store the current state of the vehicle operational parameters in the memory, and configuring the tablet to not store vehicle operational parameters unless specifically instructed by the materials handling vehicle processor to do so.

Also, in some embodiments, the process further comprises instructing by the processor of the materials handling vehicle, the tablet to store a current state of the vehicle operational parameters so that the tablet can communicate at least one vehicle operational parameter to a remote device regardless of whether the materials handling vehicle is powered or whether the materials handling vehicle is powered down.

By way of example, the wired communication protocol, e.g., USB, can be used to pass a discovery parameter from the tablet to the embedded controller (or from the embedded controller to the tablet). This discovery parameter can be used to authenticate the wireless connection. For instance, the tablet can broadcast a discovery name as the second device identification. Here, the embedded controller is certain to pick the correct wireless connection to the tablet, even where numerous tablets are broadcasting in the range of the embedded controller, because the correct discovery name was sent to the embedded controller via USB.

The tablet can also be authenticated to a remote server using an authentication protocol, e.g., by using a randomized cypher every time a socket is opened between the tablet and the remote server.

The packet can also be wrapped with an encryption such as a transport layer security (TLS) cryptographic protocol to provide added security between the tablet and the embedded information core. As another example, a format for the packet can depend upon a cypher. Here, the cypher can be fixed or constantly change based upon a predetermined interval. For instance, the tablet can communicate using a protocol that changes every predetermined time interval, where packets communicated using the protocol are encrypted. In another example embodiment, a format for the packet depends upon a cypher that continually changes based upon a predetermined interval.

As yet another example, a security process may comprise establishing a connection between the tablet and the embedded controller of the materials handling vehicle, and identifying a challenge question and answer tuple from a set of challenge question and answer tuples. An identified challenge question is presented to the tablet, which formulates an answer. The embedded controller receives an answer via the tablet, and determines whether the received answer corresponds to an answer associated with the question and answer tuple. Thus, the embedded information core can maintain the secure connection if the received answer corresponds to the answer associated with the question and answer tuple, and end the secure connection if the received answer does not correspond to the answer associated with the question and answer tuple.

To add an extra layer of security, the system can run the tablet in kiosk mode with a control application that serves as a supervisory application to consume at least one physical button (e.g., the home button) on the tablet. This allows the tablet to deny a startup load of a boot kernel of the tablet if the boot kernel is not signed with an authorized signature. In this regard, a first authorized signature may be required to load applications to the tablet, and a second authorized signature may be required to modify an operating system of the tablet.

In this context, an "authorized" signature is a signature that satisfies authentication credential(s), which may be specified by a trusted source, e.g., a manufacturer, trusted third party, or other authorized source of digital information.

In some embodiments, an algorithm validates the authenticity, integrity, origin, source, content, combinations thereof, etc., of digital information (e.g., a signature, certificate, signed code, to ensure that only valid and authorized code is loaded and/or executed (e.g., boot kernel in the above example). Correspondingly, an "unauthorized" signature can include an absence of a signature, a signature that is presented but determined to be invalid, a signature that is presented but determined to be expired, a signature that otherwise fails to designate or otherwise present proper authentication credential(s), a signature that fails an integrity check, etc.

The tablet can be configured to operate specifically and exclusively with the materials handling vehicle, for purposes of carrying out materials handling vehicle functionality. Alternatively, the tablet can allow access to the operating system, e.g., to perform non-vehicle functions, such as to play a game, access the internet, play music, etc. Here access can be limited based upon time, day, shift, location, or other environmental parameter. As an example, based upon at least one environmental parameter such as time of day, the tablet can be controlled to limit access of a wireless radio of the tablet. This allows the tablet to permit wireless communication with only one remote internet site (or group of pre-approved sites) during a predefined, time constrained window.

Miscellaneous

With reference to the FIGURES generally, reference to a wireless connection can be any wireless connection. Thus, although described with reference to Bluetooth for sake of example, the connection can be replaced with ultra-wideband, Wi-Fi, cellular, Zigbee, etc. Analogously, reference to a wired connection can be any wired connection, such as USB, firewire, thunderbolt, Universal Asynchronous Receiver/Transmitter (UART), Serial Peripheral Interface (SPI), Inter Integrated Circuit (I2C), Controller Area Network (CAN), etc.

A conventional user interface on a materials handling vehicle comprises a screen, e.g., LCD (liquid crystal display) screen with an embedded operating system (OS), such as a custom OS, Linux, Windows, Android, etc. However, aspects of the present disclosure decouple the industrial hardware from the technology hardware. Leveraging a portable device for the portions of the design that frequently change with technology cycles (wireless radios, display/touchscreen, processing power) allows for a flexible and robust architecture that may be updated more rapidly and with less effort than a fully embedded approach.

Computer System Overview

Figure 9:
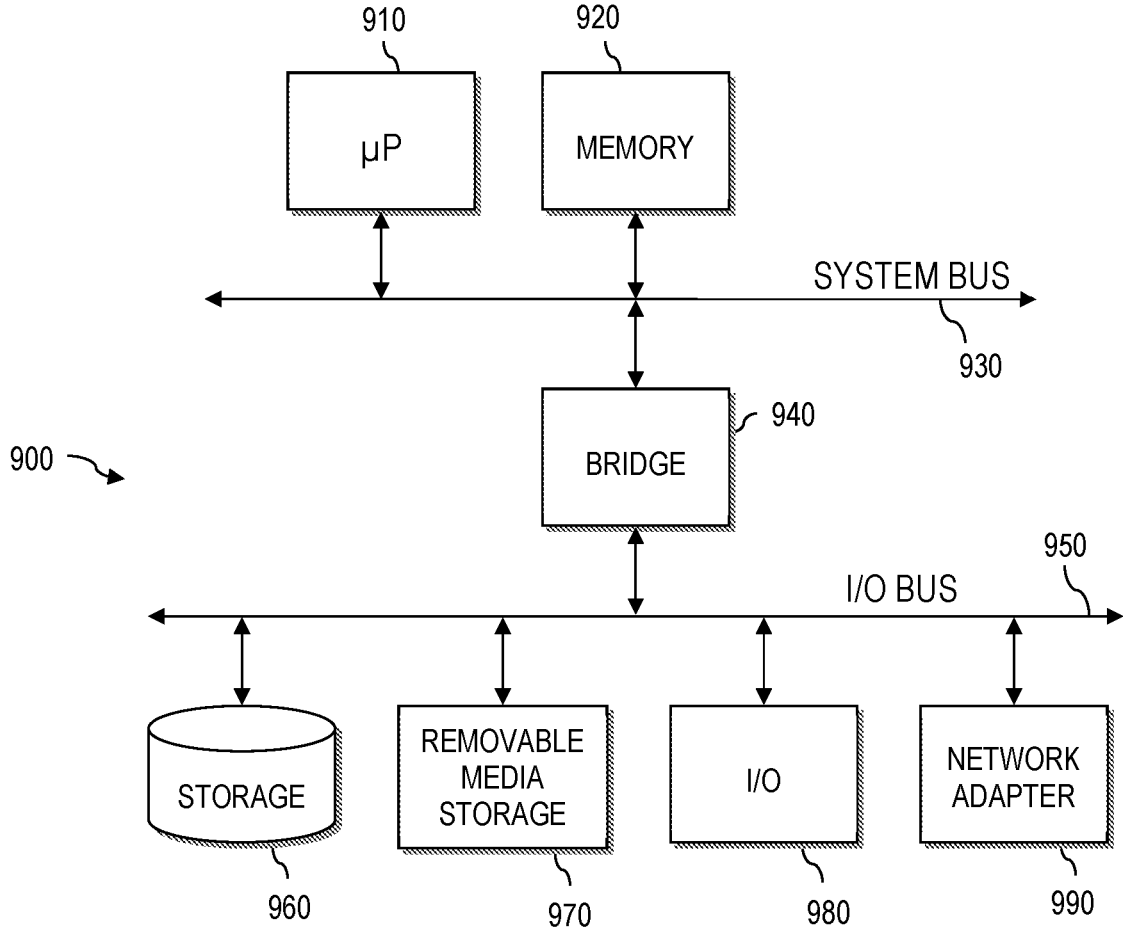
FIG. 9 is a block diagram of a computing system capable of carrying out aspects of the present disclosure.

Referring to FIG. 9, a schematic block diagram illustrates an exemplary computer system 900 for implementing the various processes described herein. The exemplary computer system 900 includes one or more (hardware) microprocessors (µP) 910 and corresponding (hardware) memory 920 (e.g., random access memory and/or read only memory) that are connected to a system bus 930. Information can be passed between the system bus 930 via a suitable bridge 940 to a local bus 950 that is used to communicate with various input/output devices. For instance, the local bus 950 is used to interface peripherals with the one or more microprocessors (µP) 910, such as storage 960 (e.g., hard disk drives); removable media storage devices 970 (e.g., flash drives, DVD-ROM drives, CD-ROM drives, floppy drives, etc.); I/O devices 980 such as input devices (e.g., mouse, keyboard, scanner, etc.), output devices (e.g., monitor, printer, etc.); and a network adapter 990. The above list of peripherals is presented by way of illustration, and is not intended to be limiting. Other peripheral devices may be suitably integrated into the computer system 900.

The microprocessor(s) 910 control operation of the exemplary computer system 900. Moreover, one or more of the microprocessor(s) 910 execute computer readable code (e.g., stored in the memory 920, storage 960, removable media insertable into the removable media storage 970 or combinations thereof, collectively or individually referred to as computer-program products) that instructs the microprocessor(s) 910 to implement the computer-implemented processes herein.

The computer-implemented processes herein may be implemented as a machine-executable process executed on a computer system, e.g., one or more of the processing devices 102, of FIG. 1, on a particular computing device such as the vehicle computer described with reference to FIG. 2 through FIG. 5, or combination thereof.

Thus, the exemplary computer system or components thereof can implement processes and/or computer-implemented processes stored on one or more computer-readable storage devices as set out in greater detail herein. Other computer configurations may also implement the processes and/or computer-implemented processes stored on one or more computer-readable storage devices as set out in greater detail herein. Computer-program code for carrying out operations for aspects of the present disclosure may be written in any combination of one or more programming languages. The program code may execute entirely on the computer system 900 or partly on the computer system 900. In the latter scenario, the remote computer may be connected to the computer system 900 through any type of network connection, e.g., using the network adapter 990 of the computer system 900.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present embodiments has been presented for purposes of illustration and description, but is not intended to be exhaustive or limited to the embodiments in the form disclosed. Many modifications and variations will be apparent to those of ordinary skill in the art without departing from the scope and spirit of the disclosed embodiments.

Having thus described the embodiments of the present application in detail, it will be apparent that modifications and variations are possible without departing from the scope of the appended claims.

What is claimed is:

1. A materials handling vehicle communication system comprising:
   a vehicle network that facilitates an exchange of information with vehicle electronic components of a materials handling vehicle;
   an embedded information core having a core processor communicably coupled to the vehicle network for communication with the vehicle electronic components; and
   a tablet that mounts to the materials handling vehicle, the tablet having a tablet processor, wherein:

the tablet is configured for communication with the embedded information core without using the vehicle network; and
the tablet is agnostic to the vehicle electronic components that communicate with the embedded information core across the vehicle network;
wherein:
   when the tablet is communicably coupled to the embedded information core, the tablet processor functions in cooperation with the core processor, defining a distributed multi-processor vehicle control architecture where the core processor receives from the tablet processor, an instruction to modify an operation of the materials handling vehicle;
   the core processor converts the instruction into a modification command according to a parameter extracted from the instruction; and
   the core processor transmits the modification command to an associated vehicle electronic component across the vehicle network to modify the operation thereof.

2. The materials handling vehicle communication system of claim 1, wherein:
   the tablet is configured to communicably couple to and communicably decouple from, the embedded information core;
   the tablet is mountable to the materials handling vehicle, and dismountable from the materials handling vehicle independent of communicable coupling to the embedded information core; and
   the tablet is configured to communicably couple to the embedded information core independent of whether the tablet is mounted or not.

3. The materials handling vehicle communication system according to claim 1, wherein:
   the tablet includes a first multi-communication protocol module that is configured to interact with a second multi-communication protocol module of the embedded information core to enable the tablet processor to communicate with the core processor via at least one wireless connection and at least one wired connection;
   further comprising:
   setting one of the wired connection or the wireless connection to have priority over the other.

4. The materials handling vehicle communication system according to claim 1, wherein:
   the embedded information core comprises a transceiver for wireless communication with a remote server;
   the embedded information core receives information from the remote server corresponding to an instruction to modify operation of the materials handling vehicle;
   the core processor effects the modification by communicating across the vehicle network to modify the operation of the materials handling vehicle; and
   the core processor communicates a message to the tablet processor to modify displayed content on the tablet display of the tablet based upon the modification to the materials handling vehicle.

5. The materials handling vehicle communication system according to claim 1, wherein the tablet runs apps independently of vehicle functionality such that no connection is required between the tablet and the embedded information core.

6. The materials handling vehicle communication system according to claim 1, wherein:
   the core processor receives from the tablet processor, the instruction to modify the operation of the materials handling vehicle by receiving an electrical signal representing the instruction to modify an operating condition of the materials handling vehicle, wherein the instruction is formatted in an open standard communication protocol; and the core processor converts the instruction received in the open standard communication protocol to the modification command to modify the associated vehicle electronic component of the materials handling vehicle according to the parameter extracted from the instruction.

7. The materials handling vehicle communication system according to claim 6, wherein the instruction received in the open standard communication protocol includes a packet having a header and payload where the payload contains the modification command, and the packet is wrapped with an encryption.

8. The materials handling vehicle communication system according to claim 1, wherein:

the tablet processor serves in a supervisory role when the tablet is communicably coupled to the core processor; and the core processor functions in a subordinate role when the tablet is communicably coupled to the core processor.

9. The materials handling vehicle communication system according to claim 1, wherein the tablet functions in an auxiliary role to a core role of the core processor.

10. The materials handling vehicle communication system according to claim 1, wherein the core processor:

determines whether the tablet is communicably coupled to the materials handling vehicle via a wired open standard communication protocol, a wireless open standard communication protocol, or both a wired open standard communication protocol and a wireless open standard communication protocol; and prioritizes the wired open standard communication protocol over the wireless open standard communication protocol where the wired open standard communication protocol is detected as being active.

11. The materials handling vehicle communication system according to claim 10, wherein the core processor:

detects that the wired open standard communication has become inactive; and switches to the wireless open standard communication protocol without interruption in a communication sequence.

12. The materials handling vehicle communication system according to claim 1, wherein:

the tablet is configured for communication with the embedded information core without using the vehicle network by:

using a universal serial bus interface for communication between the tablet and the embedded information core.

13. The materials handling vehicle communication system according to claim 1, wherein:

the tablet receives an instruction to modify operation of the materials handling vehicle from a remote server across a wireless network connection;

the tablet processor, responsive to receiving the instruction from the remote server, communicates the instruction to the core processor; and the core processor utilizes a data synchronization manager to convert the received instruction to an configuration information comprising select one of an updated set point, configuration, setting, or parameter and communicates the configuration information to an appropriate vehicle component across the vehicle network.

14. The materials handling vehicle communication system according to claim 1, wherein:

the embedded information core receives an instruction to modify operation of the materials handling vehicle from a device other than the tablet;

the core processor communicates configuration information to an appropriate vehicle component across the vehicle network based upon the received instruction;

a data synchronization manager converts at least one of the instruction and the received configuration information to an output; and the tablet processor utilizes the output to update a tablet display.

15. The materials handling vehicle communication system according to claim 1, wherein:

the embedded information core includes a data synchronization manager that cooperates with a corresponding data synchronization manager of the tablet in order to exchange vehicle information.

16. The materials handling vehicle communication system according to claim 1, wherein:

the tablet runs an Android operating system.

17. The materials handling vehicle communication system according to claim 1, wherein:

the tablet communicably couples to the embedded information core through at least one direct physical communication port of the embedded information core; and the tablet is unaware of network system protocols required for communicating across or otherwise accessing the vehicle network.

18. The materials handling vehicle communication system according to claim 1, wherein:

the core processor is configured to:

receive a first device identification of the tablet coupled via a wired open standard communications protocol;

receive a second device identification via a wireless open standard communications protocol;

determine whether another device is already coupled to the materials handling vehicle via the wireless open standard communications protocol; and communicably couple the tablet to the materials handling vehicle via the wireless open standard communications protocol if another device is not already coupled to the materials handling vehicle via the wireless open standard communications protocol and the second device identification matches the first device identification.

19. The materials handling vehicle communication system according to claim 1, wherein:

the embedded information core and the tablet communicate via direct communication over a universal serial bus connection and a bluetooth connection, wherein the universal serial bus connection is utilized to pass a discovery parameter between the tablet and the embedded information core.

* * * * *